US012146269B2

(12) United States Patent
Henke et al.

(10) Patent No.: US 12,146,269 B2
(45) **Date of Patent: *Nov. 19, 2024**

(54) SPIKE PULLER WORKHEAD WITH INDEPENDENT CONTROL

(71) Applicant: S.W.N.G., Inc., Franklin Park, IL (US)

(72) Inventors: Daniel M. Henke, Brown Deer, WI (US); Justin J. Pipol, Hartland, WI (US)

(73) Assignee: S.W.N.G., Inc., Franklin Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/193,000

(22) Filed: Mar. 30, 2023

(65) Prior Publication Data

US 2023/0235518 A1 Jul. 27, 2023

Related U.S. Application Data

(63) Continuation of application No. 17/647,522, filed on Jan. 10, 2022, now Pat. No. 11,624,158, which is a (Continued)

(51) Int. Cl.
*B25C 11/00* (2006.01)
*E01B 29/26* (2006.01)

(52) U.S. Cl.
CPC .............. *E01B 29/26* (2013.01); *B25C 11/00* (2013.01)

(58) Field of Classification Search
CPC ......... B25C 11/00; B25C 11/02; B25C 13/00; E01B 29/26; E01B 27/16
See application file for complete search history.

(56) References Cited

U.S. PATENT DOCUMENTS 3,066,913 A 12/1962 Leeson
3,365,164 A 1/1968 Engels
(Continued)

OTHER PUBLICATIONS

Nordco, "Spike Puller Two Rail", [online] (retrieved from the internet on Jun. 18, 2019) <URL: https://www.nurdco.com/products-catalog/maintenance-of-w8ylSpike-Pulling-Machines/Spike-Puller-Two-Rail--SPZRhim>, Mar. 30, 2018 (30.D3.201B), entire document.

(Continued)

*Primary Examiner* — Lee D Wilson
(74) *Attorney, Agent, or Firm* — Neal, Gerber & Eisenberg LLP

(57) ABSTRACT

A spike puller apparatus comprises a subframe, a pair of opposed puller arms for engaging with spikes to be pulled via a replaceable puller tool mounted on the end of each puller arm, a pair of horizontal shafts and an actuator to selectively translate each puller arm with respect to one another, an actuator to articulate each respective puller arm for pulling spikes, an A-frame connected to the subframe to resist and/or apply pulling forces to a spike being pulled, and a vertical actuator connected to the A-frame to cause the vertical slide carrier to move up and down along the pair of vertical shafts to effect a spike pulling operation. The respective puller arms are independently controllable, and may be selectively staggered with respect to one another along a rail to allow selective independent and/or simultaneous pulling of rail spikes and/or anchor spikes on opposite sides of the rail.

20 Claims, 30 Drawing Sheets

Related U.S. Application Data continuation of application No. 16/399,039, filed on Apr. 30, 2019, now Pat. No. 11,220,791.

(60) Provisional application No. 62/832,874, filed on Apr. 11, 2019.

(56) References Cited

U.S. PATENT DOCUMENTS

| | | | | |
|---|---|---|---|---|
| 3,405,649 | A | 10/1968 | Foxx et al. | |
| 3,414,316 | A | 12/1968 | Stanley et al. | |
| 3,426,698 | A | 2/1969 | Foxx et al. | |
| 3,465,687 | A | 9/1969 | Kerns | |
| 3,552,320 | A | 1/1971 | Traupmann | |
| 3,635,164 | A | 1/1972 | Patton | |
| 4,131,067 | A | 12/1978 | Newman et al. | |
| 4,155,507 | A | 5/1979 | Chierici et al. | |
| 4,493,202 | A | 1/1985 | Stafford | |
| 4,538,793 | A | 9/1985 | Dieringer et al. | |
| 4,579,061 | A | 4/1986 | Dieringer | |
| 4,874,518 | A | 10/1989 | Kirkland et al. | |
| 5,191,840 | A | 3/1993 | Cotic et al. | |
| 5,253,844 | A | 10/1993 | Cotic et al. | |
| 5,487,341 | A | 1/1996 | Newman et al. | |
| 5,542,355 | A | 8/1996 | Madison et al. | |
| 6,095,053 | A | 8/2000 | Johnsen et al. | |
| 6,974,087 | B2 | 12/2005 | Faichney | |
| 7,216,590 | B2 | 5/2007 | Eldridge et al. | |
| 7,353,757 | B2 | 4/2008 | Eldridge | |
| 8,485,103 | B2 | 7/2013 | Miller et al. | |
| 8,516,695 | B2 | 8/2013 | Zhao et al. | |
| 8,516,965 | B2 | 8/2013 | Pier et al. | |
| 8,857,344 | B2 | 10/2014 | Pier et al. | |
| 9,771,690 | B2 | 9/2017 | Henke | |
| 10,190,264 | B2 | 1/2019 | Hamilton et al. | |
| 11,220,791 | B2 * | 1/2022 | Henke | E01B 29/26 |
| 11,624,158 | B2 * | 4/2023 | Henke | B25C 11/00<br>254/18 |
| 11,746,474 | B2 | 9/2023 | Pipol et al. | |
| 11,753,775 | B2 | 9/2023 | Fuessel et al. | |
| 2005/0081735 | A1 | 4/2005 | Hosking et al. | |
| 2006/0096399 | A1 | 5/2006 | Harper et al. | |
| 2009/0095188 | A1 | 4/2009 | Bounds | |
| 2018/0223482 | A1 | 8/2018 | Hamilton et al. | |
| 2018/0355559 | A1 | 12/2018 | Pipol et al. | |
| 2019/0010665 | A1 | 1/2019 | Vargas et al. | |
| 2020/0325635 | A1 * | 10/2020 | Henke | E01B 29/26 |
| 2022/0127795 | A1 | 4/2022 | Henke et al. | |
| 2023/0235518 | A1 * | 7/2023 | Henke | E01B 29/26<br>254/18 |

OTHER PUBLICATIONS

Swingmaster, “SSPW Swingrnaster Spike Puller Workhead”, [online] (retrieved from the internet on 18.062019) <URL: http://www.swingmastercorp.comlwpcontent/uploads/2018/09/SSPW-Brud1ure.pdf>, Jun. 14, 2019 (Jun. 14, 2019), entire document.

International Search Report and Written Opinion in International Application No. PCT/US19/29934, Jul. 19, 2019, 17 pages.

International Search Report and Written Opinion in International Application No. PCT/US19/58091, Jan. 9, 2020, 5 pages.

International Search Report and Written Opinion in International Application No. PCT/US20/48811, Nov. 24, 2020, 13 pages.

YouTube, “2nd Tie Spiker—14th Machine in CP Rail work gang, published Mar. 26, 2014; Link: https://www .youtube.com/watch?v=y-KqWCwyVeU” (2 pages).

International Preliminary Report on Patentability in International Application No. PCT/US19/29934, Sep. 28, 2021, 9 pages.

International Preliminary Report on Patentability in International Application No. PCT/US19/58091, Sep. 28, 2021, 4 pages.

* cited by examiner

SPIKE PULLER WORKHEAD WITH INDEPENDENT CONTROL

CROSS REFERENCE

This application is a continuation of U.S. patent application Ser. No. 17/647,522 filed Jan. 10, 2022, which is a continuation of U.S. patent application Ser. No. 16/399,039, filed on Apr. 30, 2019, which claims the benefit of U.S. Provisional Patent Application No. 62/832,874, filed on Apr. 11, 2019. These applications are incorporated by reference herein in their entirety.

BACKGROUND

This disclosure relates to the field of machines for maintaining railroads, and in particular, to machines that remove railroad spikes embedded in railroad ties along rails of a railroad track.

Railroad spikes in railroad ties of a railroad track may need to be removed from time to time to enable railroad operators to maintain railroad tracks. Conventional railroad spike puller machines are configured to transit along railroad rails of a railroad track and are positionable over railroad spikes designated to be pulled. A typical railroad track includes a railroad rail supported by a tie plate, which is supported by a wooden railroad tie positioned transverse to the rail, where the tie plate and the rail are anchored to the railroad tie with one or more railroad spikes. When it becomes necessary to remove the railroad spikes to remove and replace, for example, the railroad rail or the railroad tie, spike pulling machines known in the art are configured to pull the railroad spike from the railroad tie. To remove the railroad spike, the spike pulling machine may be configured to grab or catch the head of the railroad spike and pull the railroad spike in a generally vertical motion.

However, prior spike pulling machines are not durable enough to withstand the rigors of pulling thousands of railroad spikes per day, every day. In addition, prior spike pulling machines are not configured to solve the problem of removing a railroad spike on one side of a rail when the other side of the rail has an obstruction, such as a horizontally-extending fastener on the opposite side of the rail for joining two adjacent rail segments together, a railroad switch, or a crossing, for example. Moreover, prior spike pulling machines are not configured to solve the problem of removing a railroad spike on one side of the rail using an independent motion from that on the other side of the rail. Further, prior spike pulling machines are not configured to solve the problem of removing a line spike and an anchor spike simultaneously, where the line spike is a railroad spike positioned along the rail to engage the base of the rail to anchor the rail to the railroad tie, and the anchor spike is a railroad spike positioned on the opposite side of the rail to anchor the tie plate to the railroad tie.

Consequently, there exists a need for an apparatus that solves these and other problems.

SUMMARY

An embodiment of a spike puller workhead for pulling spikes from railroad ties is disclosed, comprising: (i) a frame; (ii) wheels coupled to the frame for rolling along a rail; (iii) a base carrier slidably coupled to the frame along a vertical axis; (iv) a puller cylinder coupled to the base carrier to cause the base carrier to slide along the vertical axis; (v) an inner puller arm including an inner puller proximal end and an inner puller distal end, wherein the inner puller proximal end is rotatably coupled to the base carrier about an inner longitudinal axis parallel to the rail, and wherein the inner puller distal end is configured for pulling inner spikes on or near the rail; (vi) an outer puller arm including an outer puller proximal end and an outer puller distal end, wherein the outer puller proximal end is rotatably coupled to the slide box about an outer longitudinal axis parallel to the rail, and wherein the outer distal end is configured to couple to an outer puller claw configured for pulling outer spikes along the rail; (vii) an inner puller claw cylinder configured to rotate the inner puller arm about the inner longitudinal axis to grasp the inner spikes along the rail; and (viii) an outer puller claw cylinder configured to rotate the outer puller arm about the outer longitudinal axis to grasp the outer spikes along the rail, wherein the inner puller claw cylinder is configured to rotate the inner puller arm independently of the outer puller claw cylinder rotating the outer puller arm.

The spike puller workhead may include vertical shafts that are coupled to the frame, where the base carrier may be slidably coupled to the frame via the vertical shafts. The puller cylinder may include a barrel and a rod, where the barrel may be coupled to the frame and the rod is coupled to the base carrier. The rod may be configured to: (a) actuate downward to an extended position to cause the inner puller arm and outer puller arm to descend toward the spikes on or near the rail; and (b) actuate upward to a retracted position to cause at least one of the inner puller arm and outer puller arm to pull an engaged spike from the ground while ascending.

The base carrier may define an inner housing and an outer housing, where the inner puller proximal end of the inner puller arm may be rotatably coupled to the base carrier within the inner housing, and where the outer puller proximal end of the outer puller arm may be rotatably coupled to the base carrier within the outer housing. The inner puller claw cylinder may include a barrel and a rod, the barrel may be coupled to the base carrier, and the rod may be coupled to the inner puller arm. The rod may be configured to retract to move the inner puller arm toward an inner spike. The outer puller claw cylinder may include a barrel and a rod, the barrel may be coupled to the base carrier, and the rod may be coupled to the outer puller arm. The rod may be configured to retract to move the outer puller arm toward an outer spike.

The spike puller workhead may include a spotting cylinder configured to couple the frame to a railroad car. The spotting cylinder may be configured to actuate to adjust respective longitudinal positions of the inner puller arm and the outer puller arm along the rail.

An embodiment of a spike puller workhead for pulling spikes from railroad ties is disclosed, comprising: (i) a frame; (ii) wheels coupled to the frame for rolling along a rail; (iii) a base carrier slidably coupled to the frame along a vertical axis, wherein the base carrier defines an inner housing and an outer housing; (iv) a puller linear actuator coupled to the base carrier to cause the base carrier to slide along the vertical axis; (v) an inner longitudinal linear actuator coupled to the inner housing of the slide box and configured to actuate along an inner longitudinal axis parallel to the rail; (vi) an inner carrier coupled to the inner longitudinal linear actuator to actuate along the inner longitudinal axis; (vii) an outer longitudinal linear actuator coupled to the outer housing of the slide box and configured to actuate along an outer longitudinal axis parallel to the rail; (viii) an outer carrier coupled to the outer longitudinal linear actuator to actuate along the outer longitudinal axis; (ix) an inner puller arm including an inner puller proximal end and an inner puller distal end, wherein the inner puller distal end is configured for pulling inner spikes along the rail, wherein the inner puller proximal end is pivotably coupled to the inner carrier about the inner longitudinal axis, and wherein actuation of inner carrier causes a position of the inner puller arm to be adjusted along the inner longitudinal axis; and (x) an outer puller arm including an outer puller proximal end and an outer puller distal end, wherein the outer puller distal end is configured for pulling outer spikes along the rail, wherein the outer puller proximal end is pivotably coupled to the outer carrier about the outer longitudinal axis, and wherein actuation of inner carrier causes a position of the outer puller arm to be adjusted along the outer longitudinal axis.

The inner longitudinal linear actuator may include: (a) a threaded rod coupled to the inner housing of the base carrier and extending along the inner longitudinal axis; and (b) a bushing threadably coupled to the threaded rod to travel along the inner longitudinal axis. The bushing may be configured to push the inner carrier along the inner longitudinal axis as the bushing travels along the threaded rod. The spike puller workhead may include at least one support shaft that is coupled to the inner housing of the base carrier and parallel to the threaded rod, and the inner carrier may be slidably coupled to the at least one support shaft to prevent the inner advancing block from pivoting about the inner longitudinal axis. The outer longitudinal linear actuator may include: (a) a threaded rod coupled to the outer housing of the base carrier and extending along the outer longitudinal axis; and (b) a bushing threadably coupled to the threaded rod to travel along the outer longitudinal axis. The bushing may be configured to push the outer carrier along the outer longitudinal axis as the bushing travels along the threaded rod. The spike puller workhead may include at least one support shaft that is coupled to the outer housing of the base carrier and parallel to the threaded rod, and the outer carrier may be slidably coupled to the at least one support shaft to prevent the outer carrier from pivoting about the outer longitudinal axis.

Another embodiment of a spike puller workhead for pulling spikes from railroad ties is disclosed, comprising: (i) a frame; (ii) wheels coupled to the frame for rolling along a rail; (iii) a base carrier slidably coupled to the frame along a vertical axis, wherein the base carrier defines an inner housing and an outer housing; (iv) a puller linear actuator coupled to the base carrier and configured to cause the base carrier to slide along the vertical axis; (v) an inner longitudinal linear actuator coupled to the inner housing of the base carrier and configured to actuate along an inner longitudinal axis parallel to the rail; (vi) an inner carrier coupled to the inner longitudinal linear actuator to actuate along the inner longitudinal axis; (vii) an outer longitudinal linear actuator coupled to the outer housing of the base carrier and configured to actuate along an outer longitudinal axis parallel to the rail; (viii) an outer carrier coupled to the outer longitudinal linear actuator to actuate along the outer longitudinal axis; (ix) an inner puller arm including an inner puller proximal end and an inner puller distal end, wherein the inner distal end is configured for pulling inner spikes on or near the rail, wherein the inner proximal end is pivotably coupled to the inner carrier about the inner longitudinal axis, and wherein actuation of inner carrier causes a position of the inner puller arm to be adjusted along the inner longitudinal axis; (x) an outer puller arm including an outer puller proximal end and an outer puller distal end, wherein the outer distal end is configured for pulling outer spikes on or near the rail, wherein the outer proximal end is pivotably coupled to the outer carrier about the outer longitudinal axis, and wherein actuation of inner carrier causes a position of the outer puller arm to be adjusted along the outer longitudinal axis; (xii) an inner puller claw linear actuator configured to pivot the inner puller arm about the inner longitudinal axis to grasp the inner spikes on or near the rail; and (xiii) an outer puller claw linear actuator configured to pivot the outer puller arm about the outer longitudinal axis to grasp the outer spikes on or near the rail, wherein the inner puller claw linear actuator is configured to pivot the inner puller arm independently of the outer puller claw linear actuator pivoting the outer puller arm.

Each of the inner puller claw linear actuator and the outer puller claw linear actuator may include a housing and a rod, the housing of the inner puller claw linear actuator may be coupled to the inner advancing block, and the rod of the inner puller claw linear actuator may be coupled to the inner puller arm. The housing of the outer puller claw linear actuator may be coupled to the outer advancing block, and the rod of the outer puller claw linear actuator may be coupled to the outer puller arm.

BRIEF DESCRIPTION OF THE DRAWINGS

For a better understanding of the features described in this disclosure, reference may be made to embodiments shown in the drawings. The components in the drawings are not necessarily to scale, and related elements may be omitted so as to emphasize and clearly illustrate the novel features described herein. In addition, system components can be variously arranged, as known in the art. In the figures, like referenced numerals may refer to like parts throughout the different figures unless otherwise specified.

DETAILED DESCRIPTION

Figure 1:
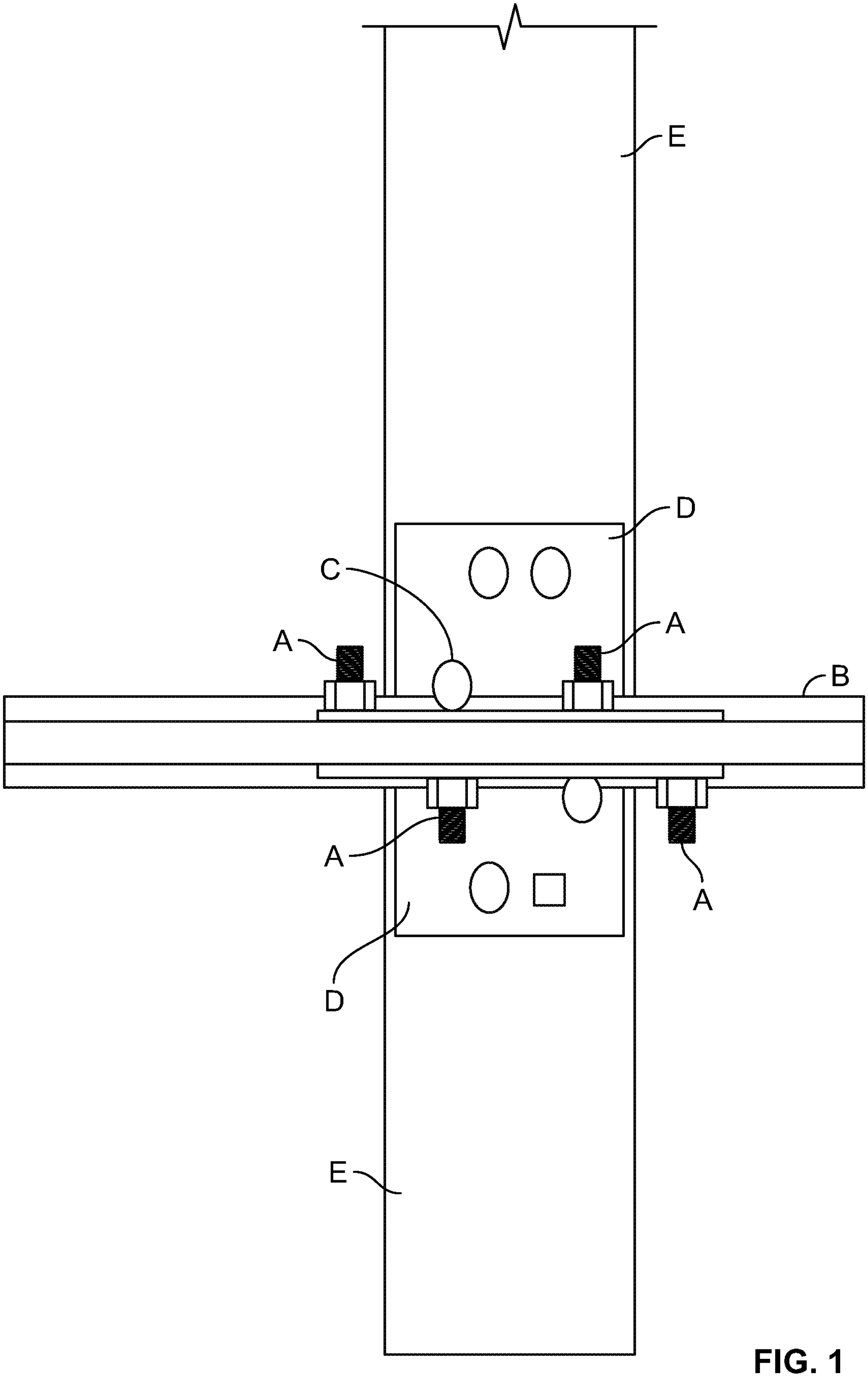
FIG. 1 is a top plan view illustrating possible spike locations in a railroad tie plate along a railroad rail.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components may be made without departing from the spirit or scope of the claims as set forth herein. Thus, it should be appreciated that any of the features of an embodiment discussed with reference to the figures herein may be combined with or substituted for features discussed in connection with other embodiments in this disclosure.

Turning to the figures, there are shown various embodiments of a workhead apparatus for pulling railroad spikes from a railroad tie. Each of the embodiments of the workhead apparatus includes two claw or puller arms, each of which includes a replaceable and/or interchangeable puller claw tool mounted thereon configured to engage with a head of a railroad spike to pull the railroad spike from the railroad tie. Each claw or puller arm is configured with, and may be articulated by, its own, dedicated actuator, such as a hydraulic cylinder, which may be electronically controlled to operate by a remote operator. The operator can choose to operate both claw or puller arms simultaneously, each individual claw or puller arm independently, or neither of the claw arms by, for example, selecting an appropriate switch or operating control from, for example, within the cab of the rail machine. The independent movement of the claw or puller arms allow the operator to avoid potential hazards during the work cycle, such as unfavorable ballast conditions, rail joint bars and bolts, crossings, switches and frogs, thereby preventing damage to the puller claw tool or workhead apparatus in general. Unlike prior railroad spike pulling mechanisms that are unable to pull a spike on one side of the rail when an obstruction blocks or interferes the travel of a claw or puller arm on the opposite side of the rail, the claw or puller arm of the workhead apparatus of the instant disclosure that is positioned on the side of the rail that is opposite the hazard is still able to pull the railroad spike. This functionality is made possible by the independently selectable movement of the claw or puller arms of the instant workhead apparatus, and/or due to the option of longitudinally staggering the claw or puller arms with respect to one another. In addition, the workhead apparatus of the instant disclosure is configured to allow pulling of a line spike (defined as a railroad spike whose head engages the base of the rail) and an anchor spike (defined as any other railroad spike that secures a tie plate to the railroad tie while not engaging the rail) positioned on opposite sides of a rail either simultaneously or independently as desired by the operator. This functionality is of considerable value to railroad operators because the position of a line spike relative to a rail and an anchor spike relative to the same side of the rail are quite different from one another. Consequently, pulling a line spike on one side of the rail simultaneously or independently of an anchor spike on the opposite side of the rail poses challenges that the workhead apparatus of the instant disclosure overcomes. Moreover, the workhead apparatus of the instant disclosure overcomes the challenge of obstacles or hazards that may otherwise interfere with pulling line spikes and anchor spikes on opposite sides of a rail.

For example, as shown in FIG. 1, the joint bolt-A in the upper right of the image extends vertically away from the rail-B, and as a result, impedes the simultaneous movement of both the inside and the outside claws or puller arms associated with conventional spike pulling machines. By contrast, the independently selectable and controllable claws or puller arms of the instant disclosure enable the operator to select the outside puller arm to actuate while leaving the inside puller arm unselected. Thus, a line spike-C that secures a tie plate-D to the railroad tie-E, where the line spike-C is located on the outside of the rail-B and opposite to a joint bolt-A on the inside of the rail-B (and vice-versa), can still be pulled from the railroad tie using the workhead apparatus of the instant disclosure.

Figure 8:
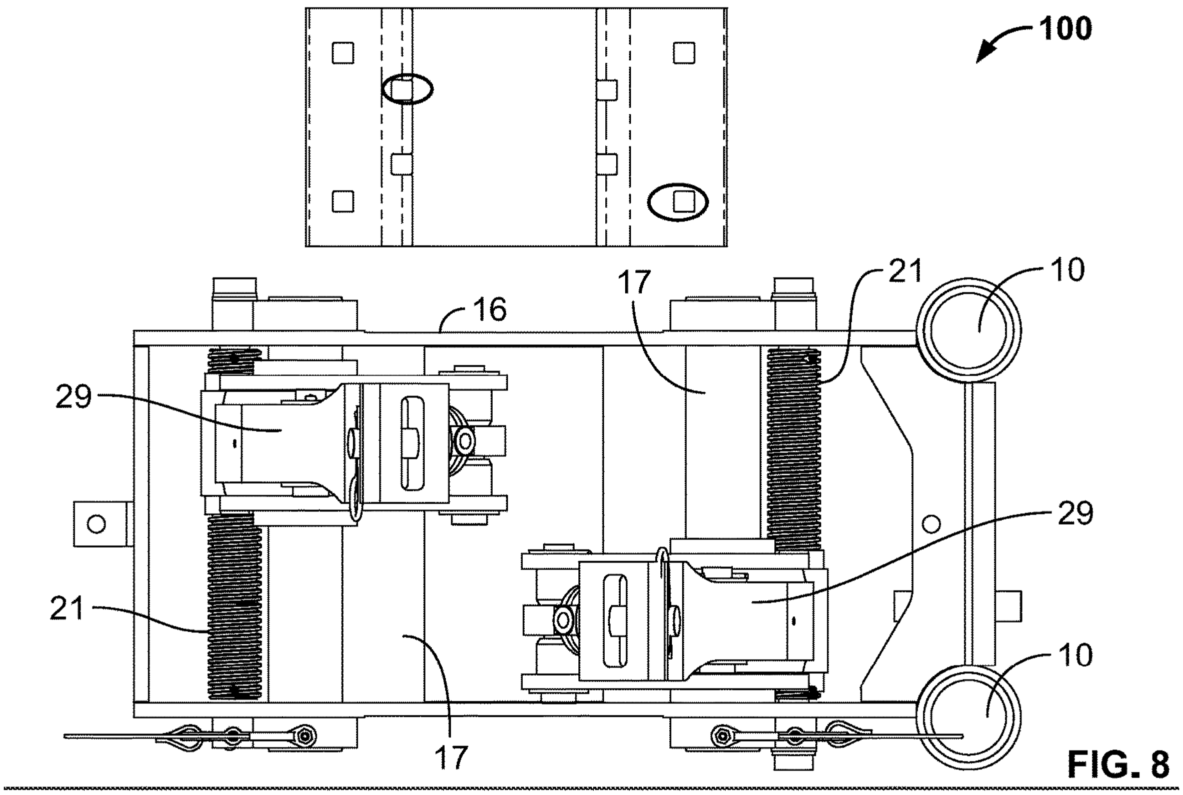
FIG. 8 is a top plan cutaway view of the embodiment shown in FIG. 1 shown in a first optional position configured for pulling a pair of railroad spikes in a first railroad spike arrangement in a tie plate.
Figure 9:
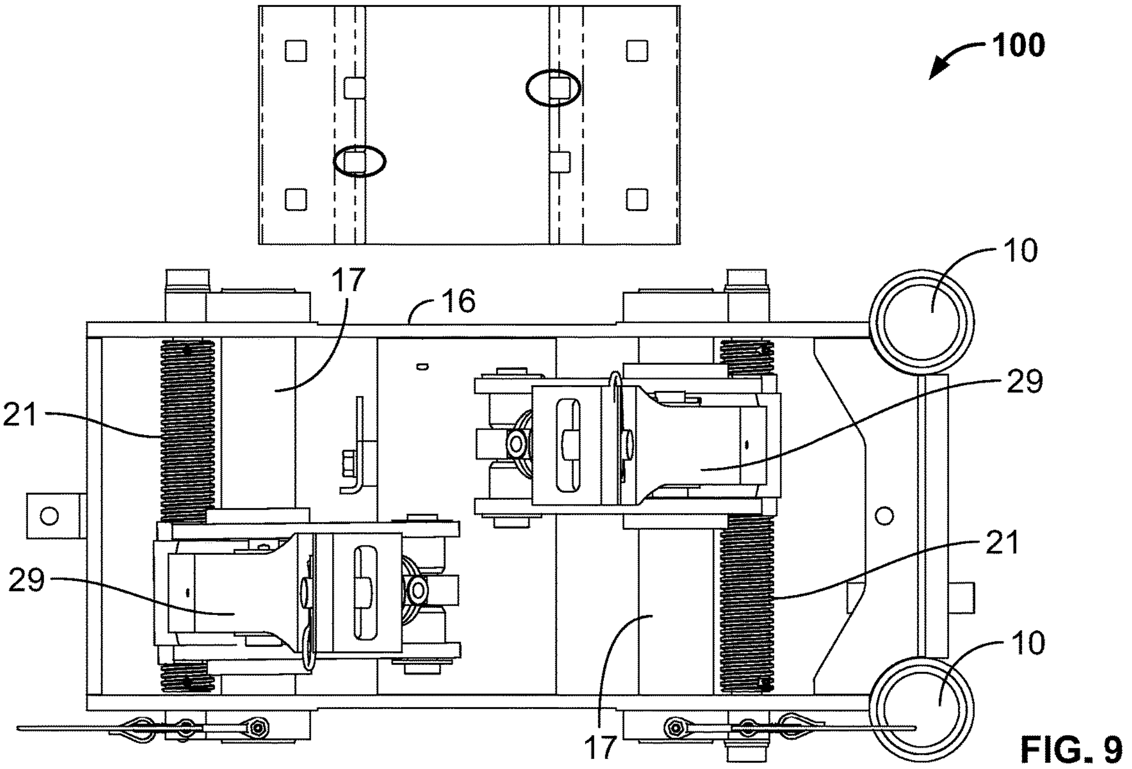
FIG. 9 is a top plan cutaway view of the embodiment shown in FIG. 1 shown in a second optional position configured for pulling a pair of railroad spikes in a second railroad spike arrangement in a tie plate.

In addition, at least one embodiment of the workhead apparatus of the instant disclosure is configured with a robust, dual-shaft pattern advancing block 22, which enables the claw or puller arm 29 on one side of the rail to be positioned in a longitudinally staggered relationship with the claw or puller arm 29 on the opposite side of the rail, as shown in FIGS. 8 and 9 in the drawings. To do this, in one embodiment, a threaded rod 21 and threaded bronze bushing 25 engage the advancing block 22 and adjust the pattern of individual puller arms 29 longitudinally forwardly and backwardly along the rail based on the spike positioning in the respective tie plates. The threaded rod 21 and bronze bushing 25 adjust the pattern by sliding the advancing block 22 on the dual shafts 17. The dual shafts 17 may also be configured to handle the entire load of the squeezing and pulling operation, unlike prior spike pulling solutions. This dual shaft design significantly reduces the amount of play that may result at the puller claw tool, which enables an operator to more precisely and repeatably align the workhead apparatus over desired railroad spikes to be pulled.

Workhead apparatus 100 of the instant disclosure is configured with subframe 1 to mount the apparatus to a rail machine and to act as a mount frame and datum for other components of the workhead apparatus 100, a pair of horizontally spaced apart spotting shafts 5 to allow the vertical slide carrier 16 to translate horizontally along the rail for alignment over designated spikes to be pulled, a pair of vertically spaced apart shafts 10 to allow the vertical slide carrier 16 to move up and down to effect a spike pulling operation, a pair of opposed puller arms 29 for engaging with spikes to be pulled via a replaceable puller tool mounted on the end of each puller arm 29, a pair of horizontal spaced apart advancing shafts 17 connected to a respective advancing block 22 and puller arm 29 to selective translate the puller arm 29 longitudinally along the rail via acme threaded rod 21 (or in other embodiments, any type of linear actuator, whether electronically controlled or manually operated), actuator 32 (which may be hydraulically, pneumatically or otherwise actuated) to articulate a respective puller arm 29 outwardly and inwardly to engage a designated spike to be pulled, spike puller A-frame 48 connected to the subframe 1 to resist and/or apply pulling forces to a spike being pulled, and actuator 60 to cause vertical slide carrier 16 to move up and down to effect a spike pulling operation. Workhead apparatus 100 additionally includes various features and components shown in the figures for locking the vertical slide carrier 16 in a transport position to allow the workhead apparatus 100 to be transported safely. These and other features, components, and functionality are described in more detail below.

Figure 10:
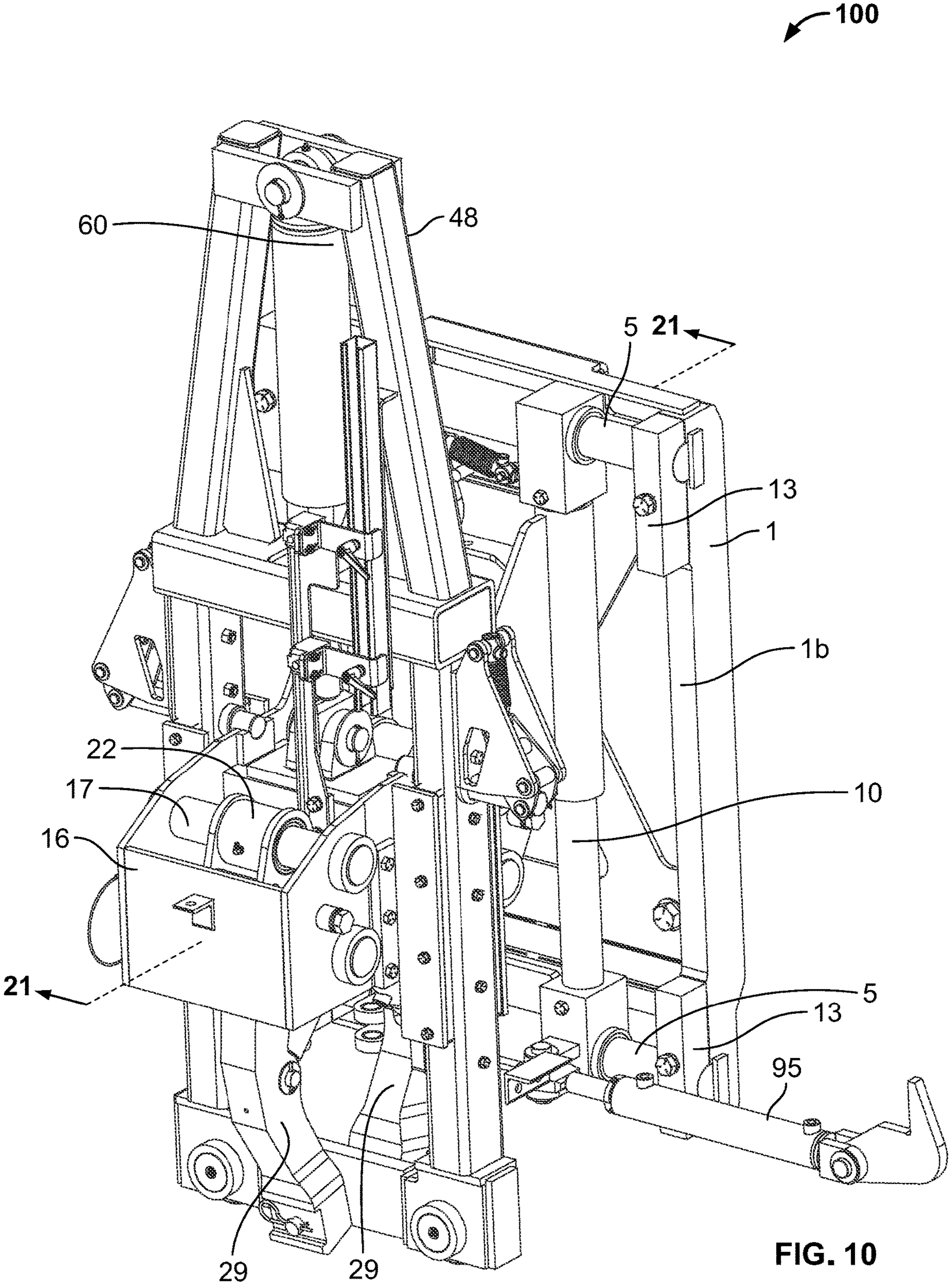
FIG. 10 is right, front, top, perspective view of another embodiment of a railroad spike puller apparatus of the instant disclosure.
Figure 11:
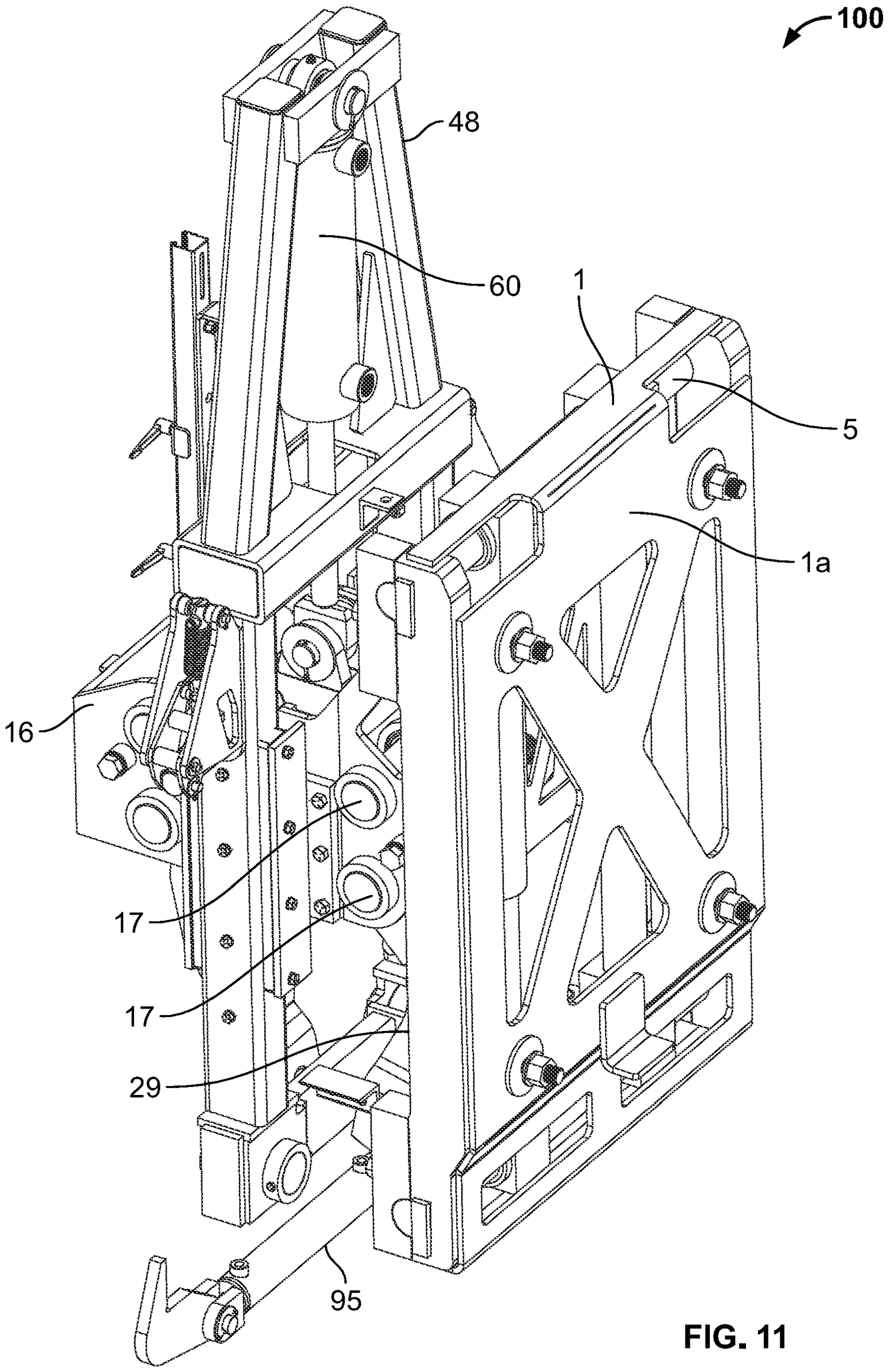
FIG. 11 is right, rear, top, perspective view of the embodiment shown in FIG. 10.

Turning to FIGS. 2 to 29, there is shown one or more embodiments of a railroad spike puller workhead apparatus 100 with independent spike puller arm control for installation onto a work train or other rail machine designed to traverse railroad rails and to be operated by an operator. In these embodiments, workhead apparatus 100 includes subframe 1 comprising rear side 1*a* (see, e.g., FIG. 11) for mounting workhead apparatus 100 onto the work train or other rail machine and front side 1*b* (see, e.g., FIG. 10).

Workhead apparatus 100 includes vertical slide carrier 16, A-frame 48, and vertical pulling actuator 60—all of which are configured to impart and/or manage repetitive spike pulling loads, sometimes thousands of times per day, every work day. In the embodiments shown in the figures, actuator 60 is configured as a hydraulic cylinder. In other embodiments, actuator 60 may be any type of actuator, including electric, pneumatic, or otherwise, to produce vertical motion of slide carrier 16.

A-frame 48 includes a pair of wheels 55 to position the workhead apparatus 100 onto a designated railroad rail. A-frame 48 is configured to support slide carrier 16 (and all components supported by slide carrier 16), which is mounted to and configured to traverse and slide upon a pair of parallel, opposed vertical shafts 10 via sleeves or bushings 7 (see FIG. 4). The upper ends of the respective vertical shafts 10 are secured to respective laterally opposed ends of slider 6. The lower ends of the respective vertical shafts 10 are secured to respective laterally opposed ends of slider 8. Sliders 6,8 are mounted to and configured to traverse and slide upon a pair of parallel, opposed horizontal shafts 5 via bushings 7. Horizontal shafts 5 are secured to subframe 1 by clamps 13 using fasteners or other appropriate fastening techniques.

Slide carrier 16 cantileverly extends from vertical shafts 10 in a direction opposite to side 1*a* of subframe 1. Slide carrier 16 includes a pair of parallel, opposed side walls 16*a* and transverse end wall 16*b* connected to the side walls 16*a*. Side walls 16*a* extend from a pair of opposed, parallel, tubular, vertical receivers 16*c* that connect to and are configured to traverse and slide upon the respective vertical shafts 10 via sleeves or bushings 7 housed in the receivers 16*c*. Slide carrier 16 is configured to support inner and outer puller arms 29, inner and outer advancing blocks 22, inner and outer parallel, opposed advancing shafts 17, inner and outer advancing rods 21, and inner and outer puller arm actuators 32.

Respective advancing shafts 17 and advancing rods 21 are configured to horizontally extend from one side wall 16*a* to the other side wall 16*a*. Respective inner and outer advancing blocks 22 are configured to traverse and slide upon respective inner and outer upper advancing shafts 17 via bushings 24. Respective advancing blocks 22 are also configured to attach to respective inner and outer advancing rods 21 configured with acme screw threads for causing the respective advancing blocks 22 to traverse laterally via bushings 25 to locations anywhere between side walls 16*a* when the advancing rods 21 are manually rotated and/or set by an operator. In other embodiments, a linear actuator and/or rotary actuator, or any other actuator configured to produce linear movement of advancing blocks 22, may be substituted for or used in conjunction with advancing rods 21. In such other embodiments, the operator may remotely command a rotary actuator, for example, to rotate a respective one of the inner and outer advancing rods 21, thereby causing lateral translation of the respective inner or outer advancing block 22 along respective advancing shafts 17 to the position desired by the operator. In the embodiment shown in FIGS. 12-17, bi-directional rotary actuator 21*a* is shown mounted on a side wall 16*a* of slide carrier 16 and connected to an outer advancing rod 21 (another rotary actuator 21*a* may be similarly connected to inner advancing rod 21). In this way, an operator may remotely command on-the-fly the lateral movement of each respective advancing block 22, and correspondingly each respective inner and outer puller arm 29, as desired to match a particular spike/tie-plate pattern.

Respective inner and outer puller arms 29 extend downwardly from respective inner and outer lower advancing shafts 17*b* via bushings 30. Inner puller arm 29 is configured to extend downwardly and inwardly and then outwardly in an arc, while outer puller arm 29 is configured to extend downwardly and outwardly and then inwardly in an arc.

Respective upper ends (i.e., the proximal ends) of inner and outer puller arms 29 lie between opposed side walls 22*a* of respective inner and outer advancing blocks 22. The upper ends (i.e., the proximal ends) of respective inner and outer puller arm actuators 32 are connected to respective inner and outer clevis pins 35, each of which extending from one side wall 22*a* to the other side wall 22*a* of respective inner and outer advancing blocks 22. The lower ends (i.e., the distal ends) of respective inner and outer puller arm actuators 32 are pivotally connected to respective inner and outer clevis pins 34, each of which extending from one side wall 29*a* to the opposite side wall 29*a* of respective inner and outer puller arms 29. In the embodiments shown in the figures, actuators 32 are configured as hydraulic cylinders. In other embodiments, actuators 32 may be any type of actuator, including electric, pneumatic, or otherwise, that impart a force upon puller arms 29.

Upper end of actuator 60 is configured to attach to upper end of A-frame 48 via clevis pin 61, and lower end of actuator 60 is configured to attach to upper end of slide carrier 16 via clevis pin 62 that extends to/from respective clevis walls 16*d*.

To control the extent of upper and lower vertical movement of slide carrier 16 for a spike pulling operation, various embodiments of workhead apparatus 100 may include upper and lower proximity switches 71. Upper and lower proximity switches 71 are held in a vertical relationship with one another via vertically oriented bracket 65. The vertical positions of the upper and lower proximity switches 71, including the vertical distance between them, may vary as determined by the operator according to the height of the rail relative to the heads of the spikes to be pulled. In some embodiments (see, e.g., FIGS. 2-11), the respective upper and lower proximity switches are positioned manually by securing them to the bracket 65. In other embodiments (see, e.g., FIGS. 2-15), either or both of the upper and lower proximity switches 71 may be remotely commanded by the operator to desired positions along bracket 65 (or suitable substitute) by commanding a linear or other actuator connected to a selected upper and/or lower proximity switch 71 to linearly move the desired upper and/or lower proximity switch 71. For example, in one embodiment, with lower proximity switch 71 in a fixed position, a linear actuator connected to the upper proximity switch 71 may be remotely commanded by, for example, the operator in the cab, to move the upper proximity switch 71 up or down to a desired position. In another embodiment, with upper proximity switch 71 in a fixed position, a linear actuator connected to the lower proximity switch 71 may be remotely commanded to move the lower proximity switch 71 up or down to a desired position. In yet another embodiment, a linear actuator connected to the upper and lower proximity switches 71 may each be remotely commanded to move up or down to respective desired positions. In a further embodiment, a first linear actuator connected to the upper proximity switch 71 and a second linear actuator connected to the lower proximity switch 71 may each be remotely commanded to cause the respective upper and/or lower proximity switches 71 to move up or down to desired positions.

Figure 12:
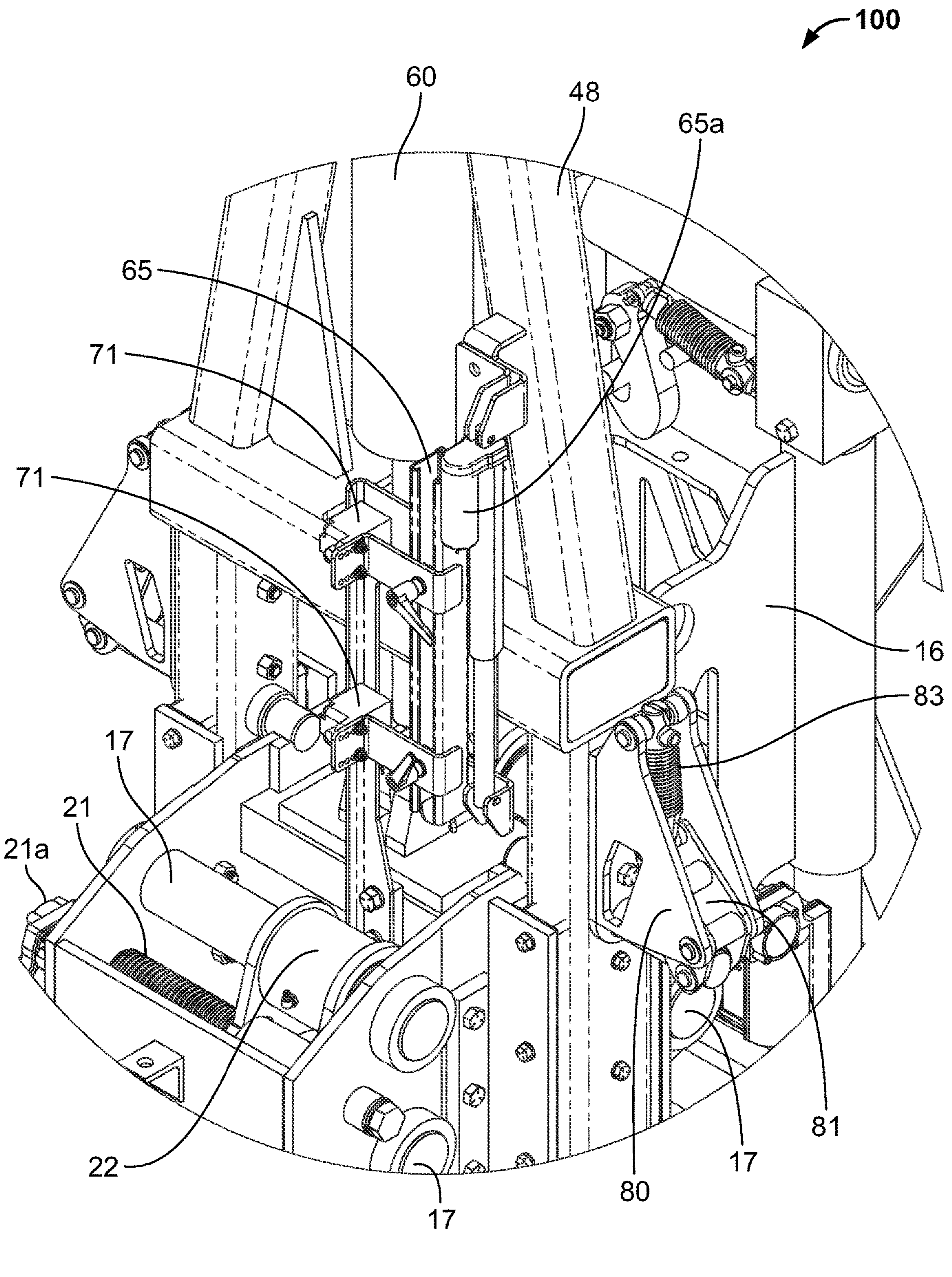
FIG. 12 is a right, front, top, partial perspective view illustrating an embodiment in which a linear actuator is in an extended position for adjusting the position of upper and lower proximity switches, and also illustrating a rotary actuator for adjusting lateral position of an outer advancing block.
Figure 13:
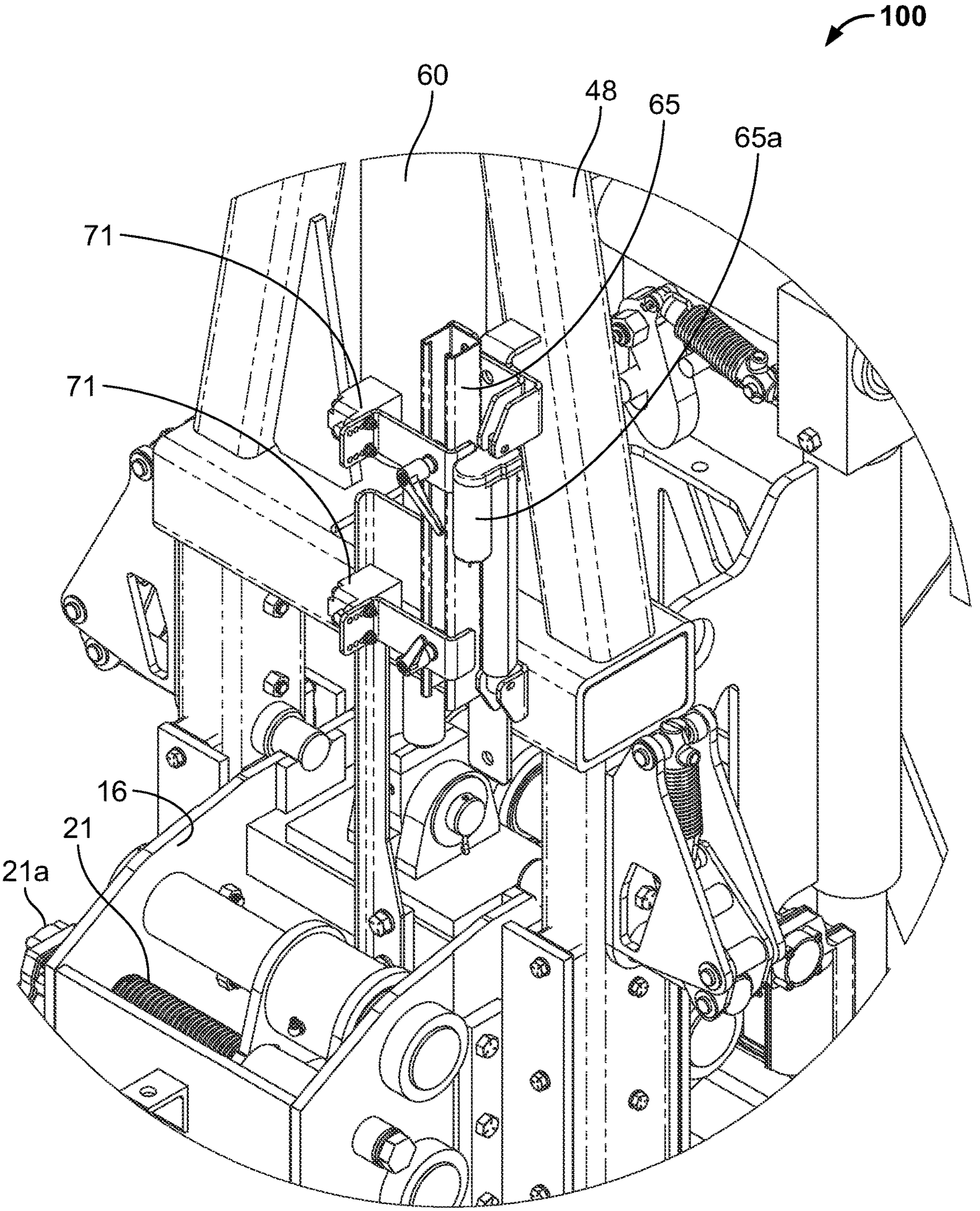
FIG. 13 is a right, front, top, partial perspective view illustrating the embodiment of FIG. 12 showing the linear actuator in a retracted position.
Figure 14:
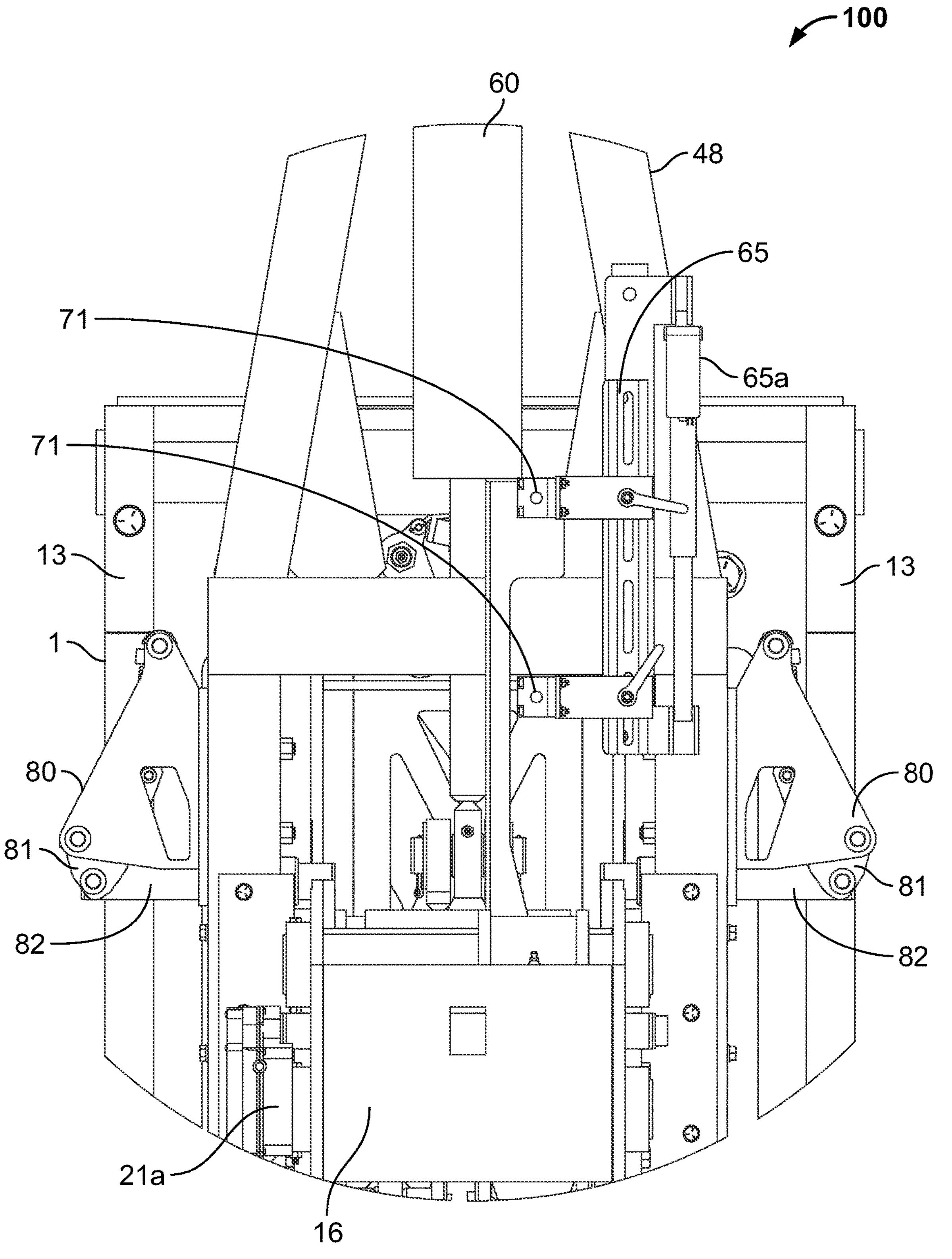
FIG. 14 is a front partial elevation view illustrating the embodiment of FIG. 12.
Figure 15:
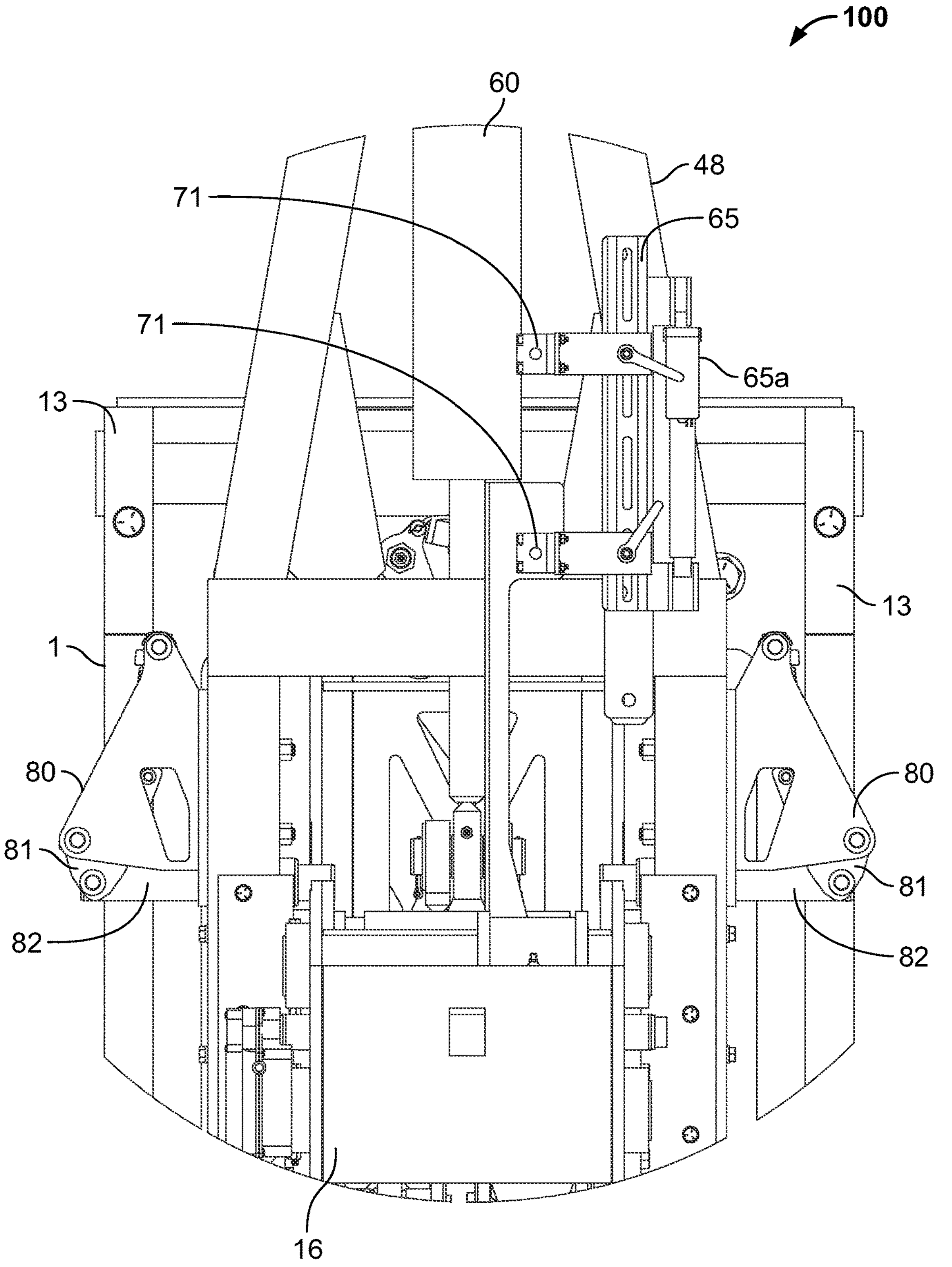
FIG. 15 is a front partial elevation view illustrating the embodiment of FIG. 13.
Figure 16:
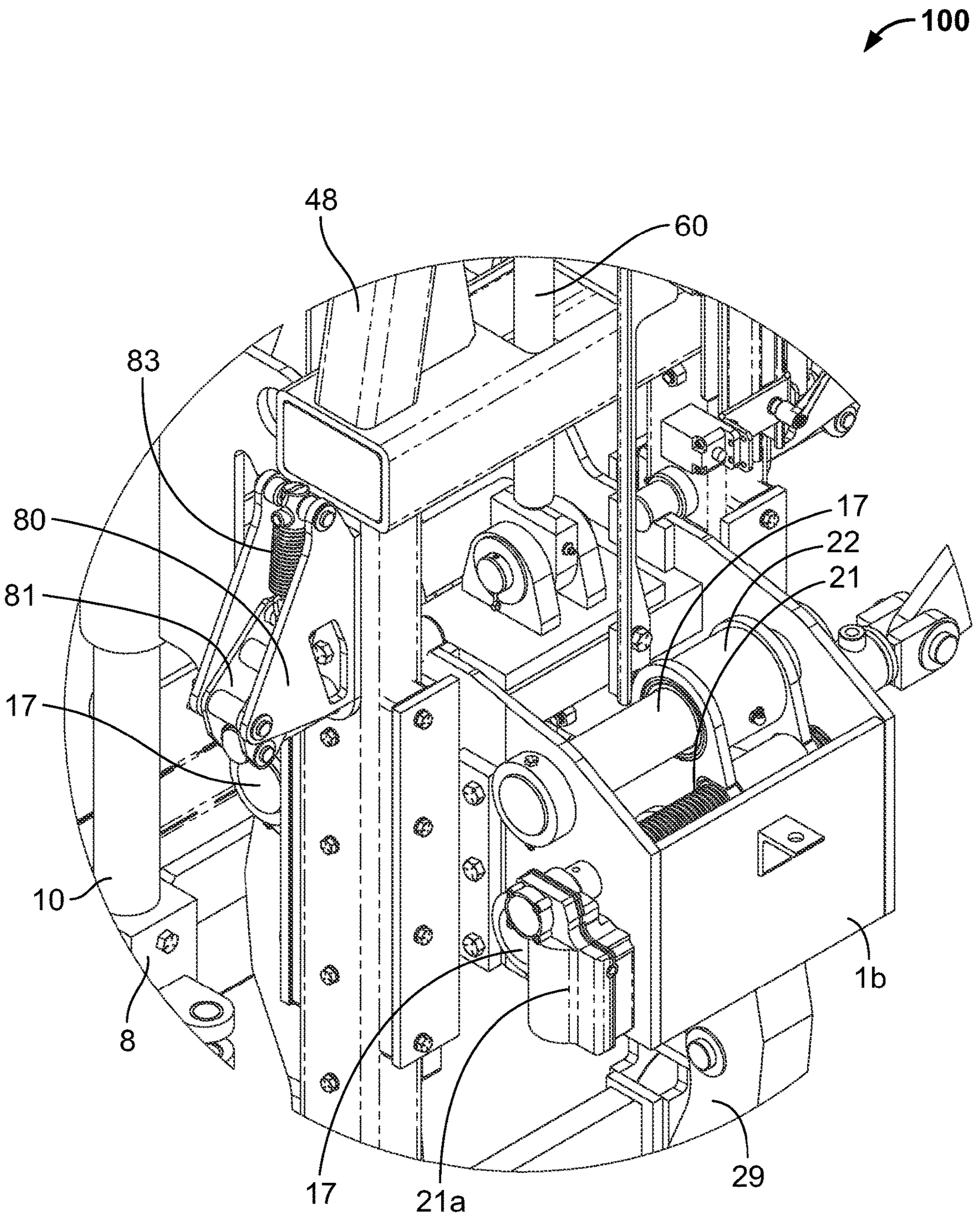
FIG. 16 is a left, front, top, partial perspective view illustrating another aspect of the rotary actuator shown in FIG. 12.
Figure 17:
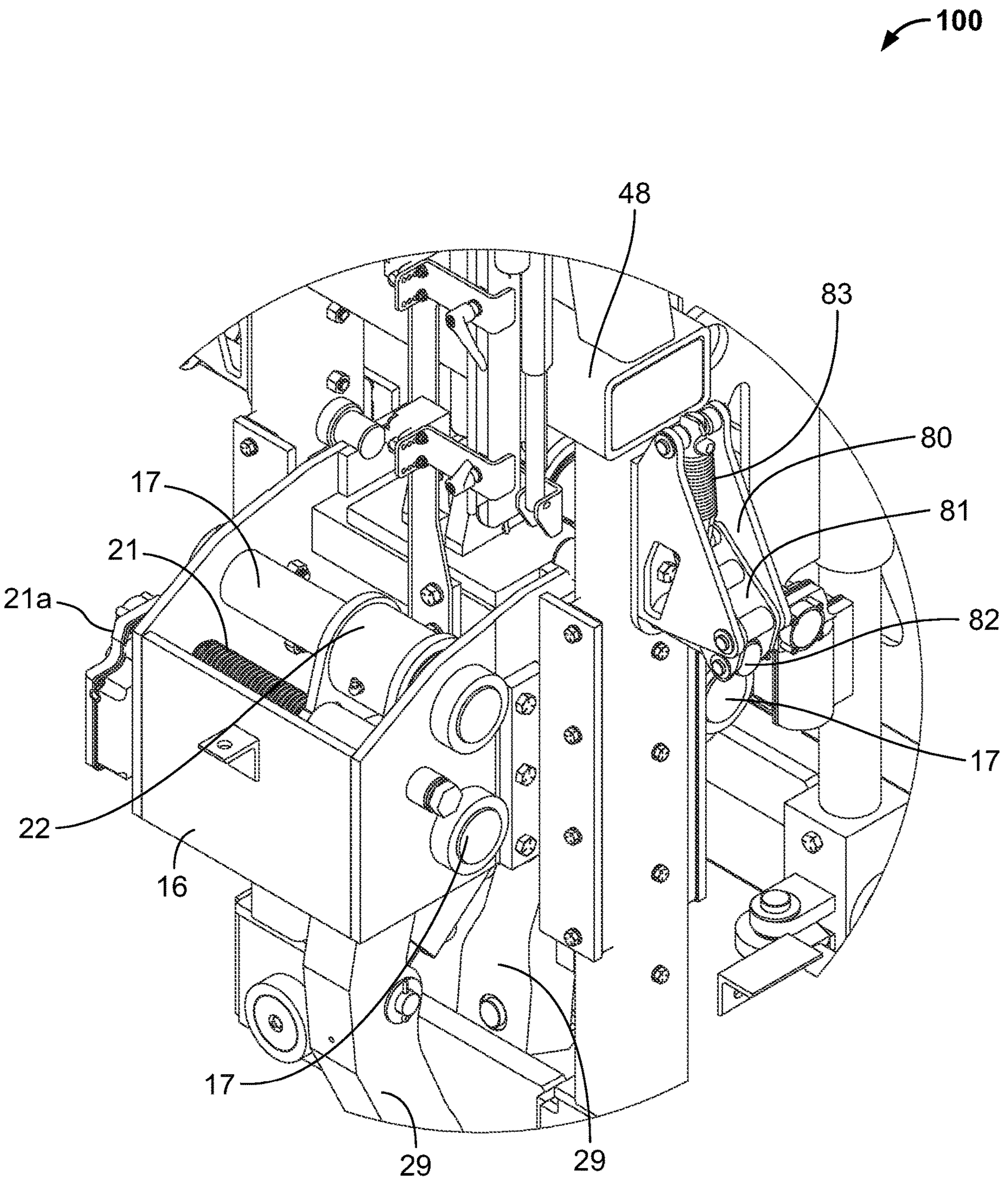
FIG. 17 is a right, front, top, partial perspective view illustrating another aspect of the rotary actuator shown in FIG. 12.

In at least some embodiments (see, e.g., FIGS. 2-11), bracket 65 is secured to A-frame 48 using fasteners or other appropriate fastening techniques. In other embodiments (see, e.g., FIGS. 12-15), bracket 65 may be secured to linear actuator 65*a* via, for example, one or more brackets, and those one or more brackets may be secured to A-frame 48. FIGS. 12 and 14 illustrate one embodiment in which linear actuator 65*a* is in a fully extended position, with both proximity switches 71 moved as a group to a lowermost position. FIGS. 13 and 15 illustrate the embodiment of FIGS. 12 and 14 with linear actuator 65*a* in a fully retracted position, with both proximity switches 71 moved as a group to an uppermost position. One of ordinary skill would appreciate that there are any number of ways to mount one or more actuators to A-frame 48 to control the movement of either or both of the upper and lower proximity switches 71.

Proximity switch trigger bracket 70, which is mounted on slide carrier 16, is configured to trigger activation of the upper and lower proximity switches 71. When trigger bracket 70 moves proximate to the upper proximity switch 71, actuator 60 is commanded to stop retracting. When trigger bracket 70 moves proximate to the lower proximity switch 71, actuator 60 is commanded to stop extending.

Workhead apparatus 100 includes features to enable the apparatus to be safely transported when not in use. For example, workhead apparatus 100 includes a lock-up mechanism to restrain slide carrier 16 from moving during transport. In the embodiments shown in the figures, the lock-up mechanism includes an upward slide carrier restraint system mounted on respective lateral sides of A-frame 48, and an downward slide carrier restraint system mounted on side 1*b* of subframe 1. For each respective lateral side of A-frame 48, the upward slide carrier restraint system includes a lock-up bracket 80 mounted to A-frame 48, lock-up actuator 83, lock-up pivot bracket 81, and lock-up horizontal pin 82. Upper end of lock-up actuator 83 is connected to an upper end of lock-up bracket 80. Lower end of lock-up cylinder 83 is connected to upper end of pivot bracket 81. Lower end of pivot bracket 81 is pivotally connected to lower end of lock-up bracket 80. The downward slide carrier restraint system includes lock-up actuator 99*a* coupled to lock-up pivot bracket 99*b*, which is configured to engage with lock-up post 99*c* (see FIG. 2). In the embodiments shown in the figures, lock-up actuators 83,99*a* are configured as spring-return hydraulic cylinders (i.e., hydraulic cylinders wrapped by coil springs). In other embodiments, lock-up actuators 83,99*a* may be any type of actuator, including electric, pneumatic, or otherwise, to impart a force on pivot brackets 81 and lock-up pivot brackets 99*b*.

The lock-up mechanism of workhead apparatus 100 is in slide carrier transport mode with lock-up actuators 83,99*a* in their respective retracted positions. Conversely, the lock-up mechanism of workhead apparatus 100 is in slide carrier operational mode with lock-up actuators 83,99*a* in their respective extended positions.

As described above, workhead apparatus 100 is configured to pull railroad spikes from locations on both sides (inner and outer) of a given rail. Workhead apparatus 100 is configured with a puller arm 29 on both sides of a single rail, where each of the puller arms 29 may be operated independently of one another. Independent operation of puller arms 29 enables line spikes and anchor spikes on respective sides of the rail to be pulled simultaneously or independently of one another regardless of whether the spikes are in staggered relationship with one another.

Workhead apparatus 100 is configured to be operated by a single operator. Multiple workhead apparatuses 100 may be arranged on a machine that traverses a railroad track to enable one or more operators to pull railroad spikes on adjacent parallel rails of a railroad track.

Figure 2:
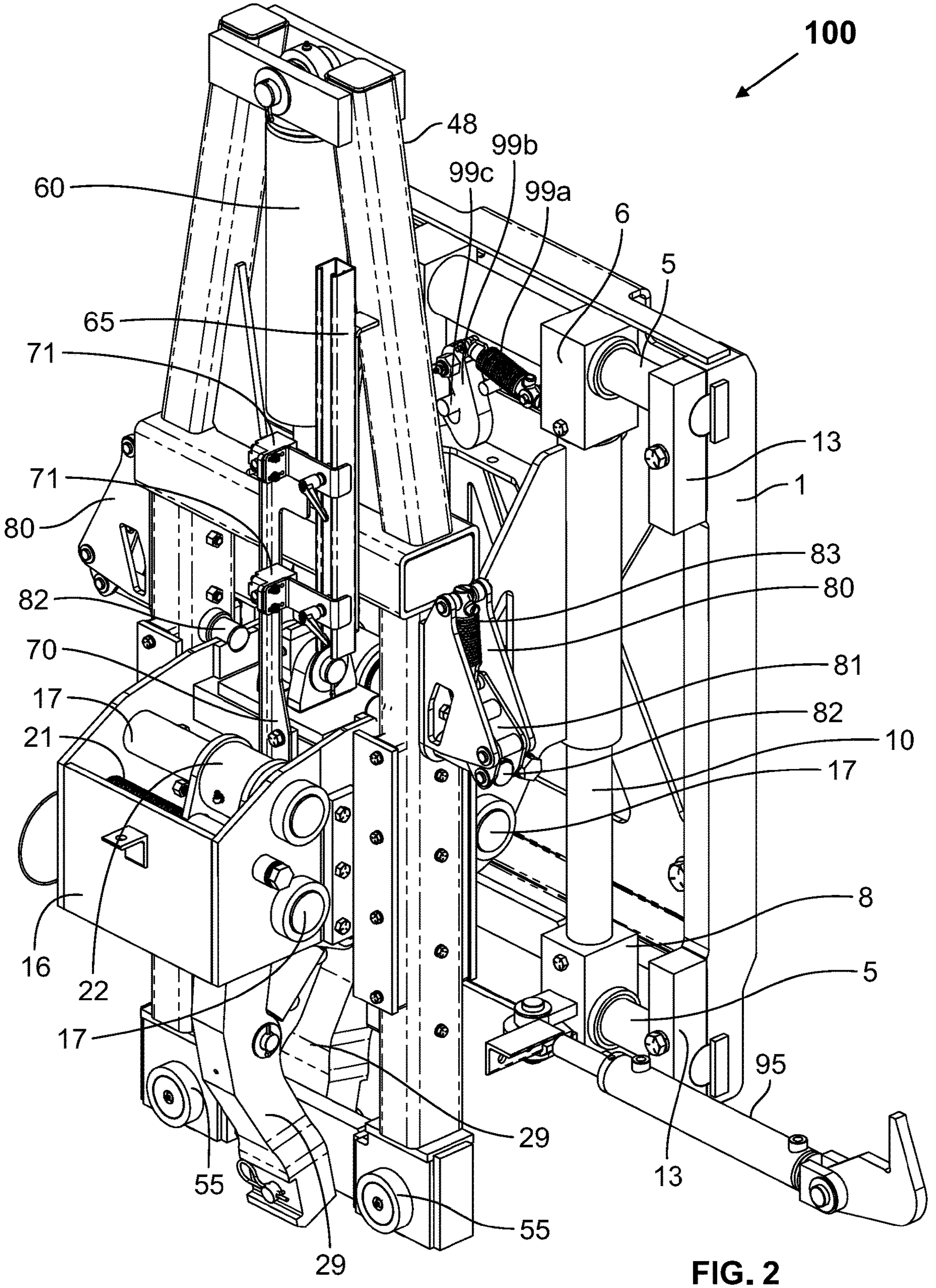
FIG. 2 is a right, front, top, perspective view of an embodiment of a railroad spike puller apparatus of the instant disclosure.
Figure 3:
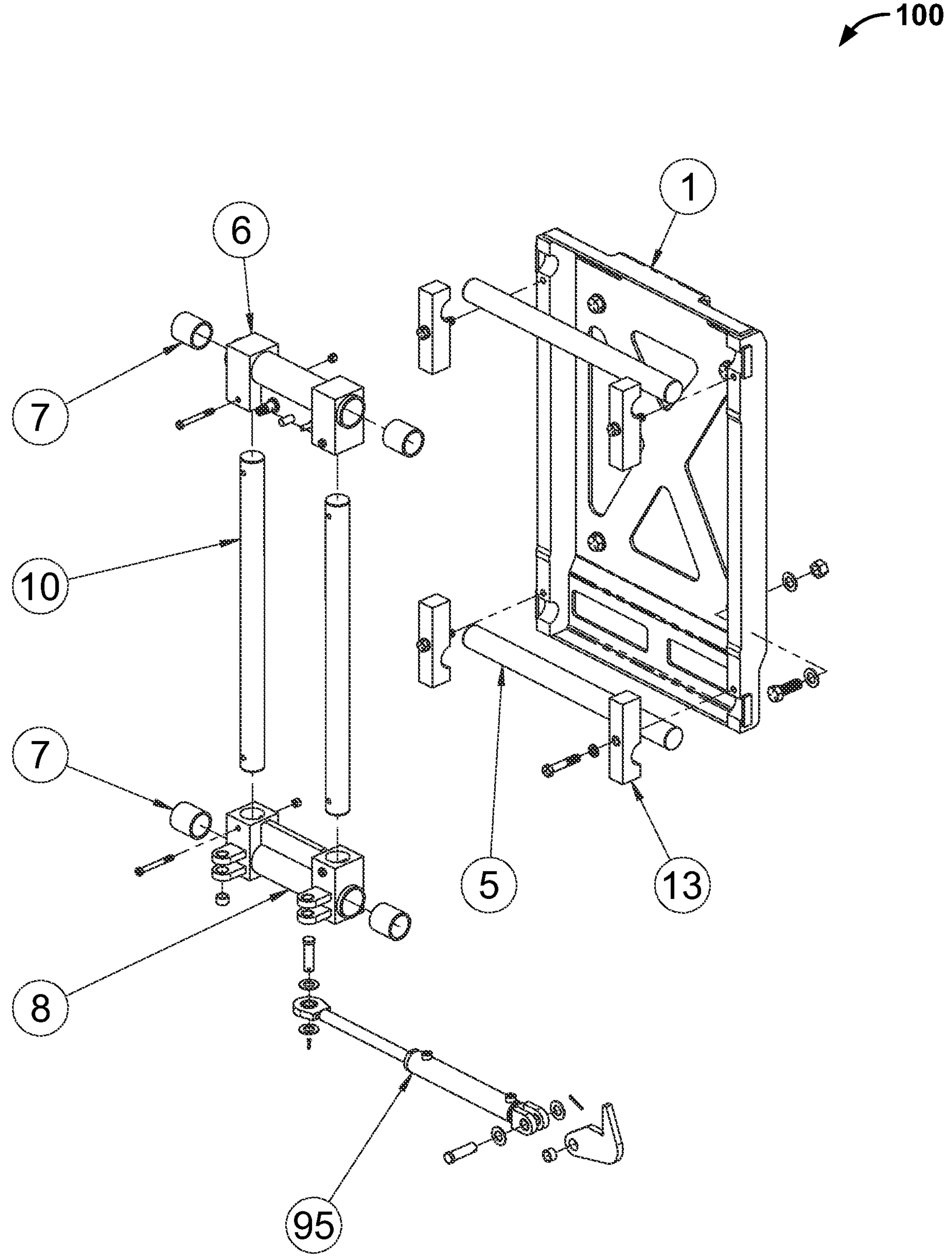
FIG. 3 is a first partial detail exploded perspective view of the embodiment shown in FIG. 1.
Figure 4:
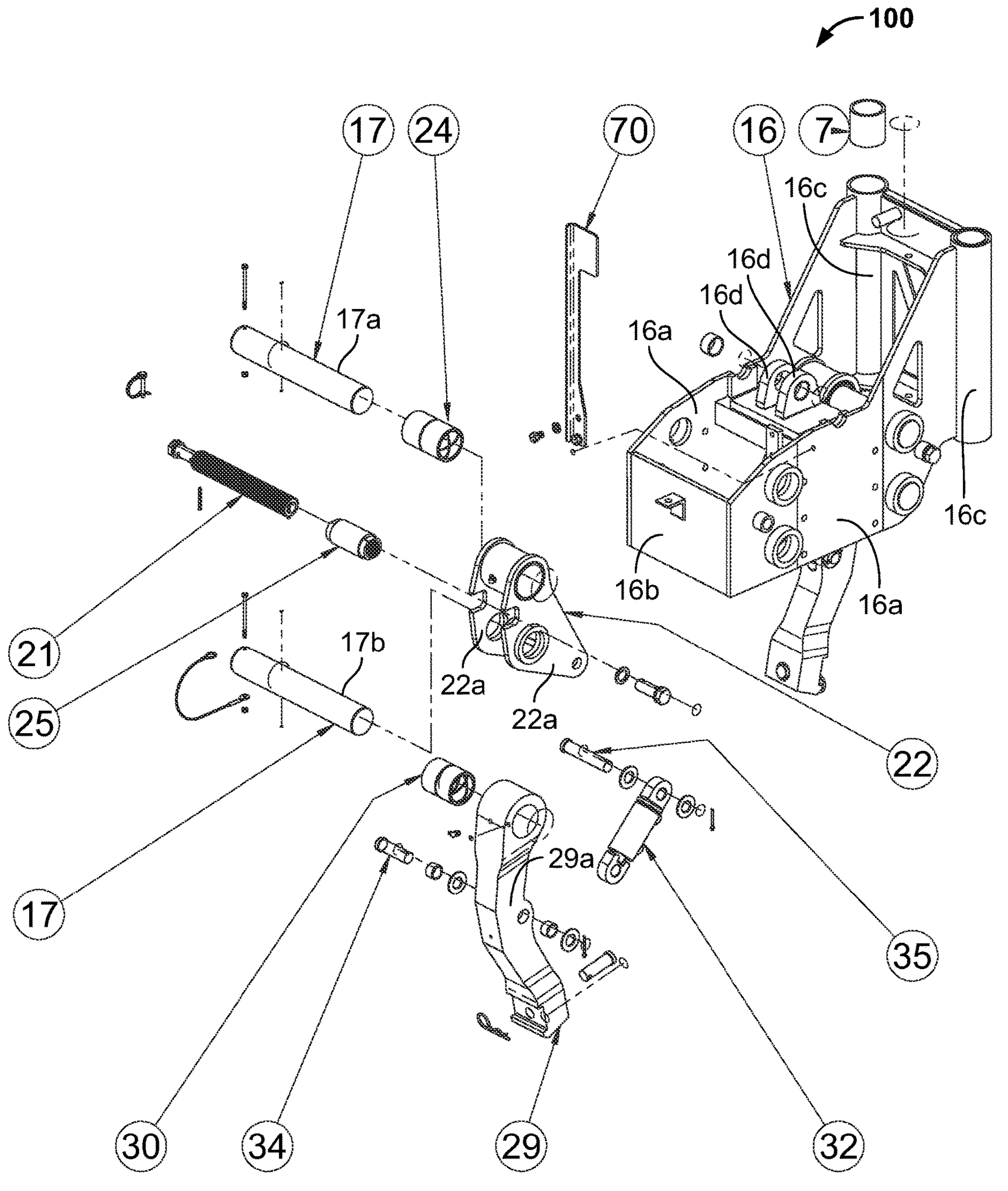
FIG. 4 is a second partial detail exploded perspective view of the embodiment shown in FIG. 1.
Figure 5:
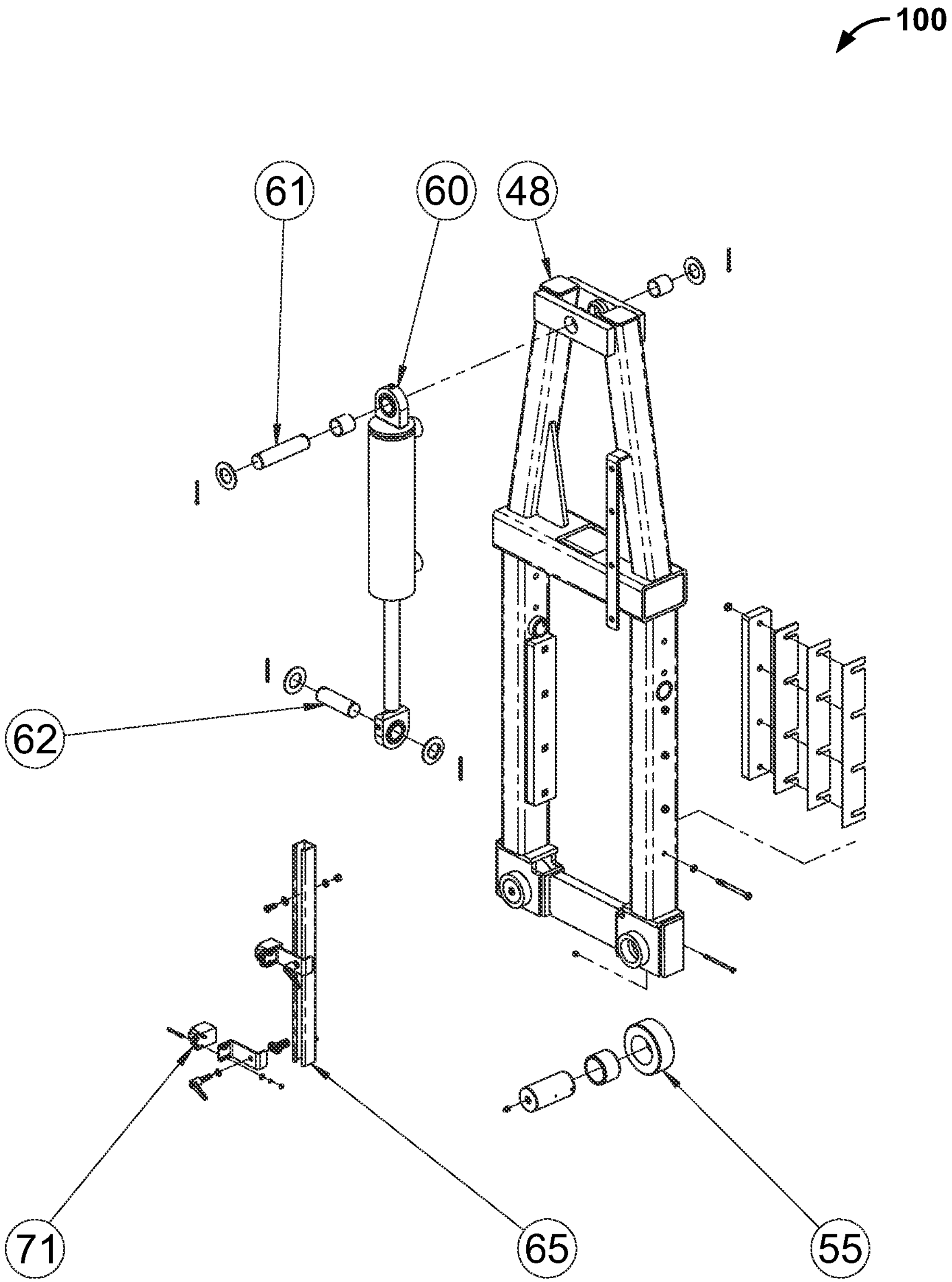
FIG. 5 is a third partial detail exploded perspective view of the embodiment shown in FIG. 1.
Figure 6:
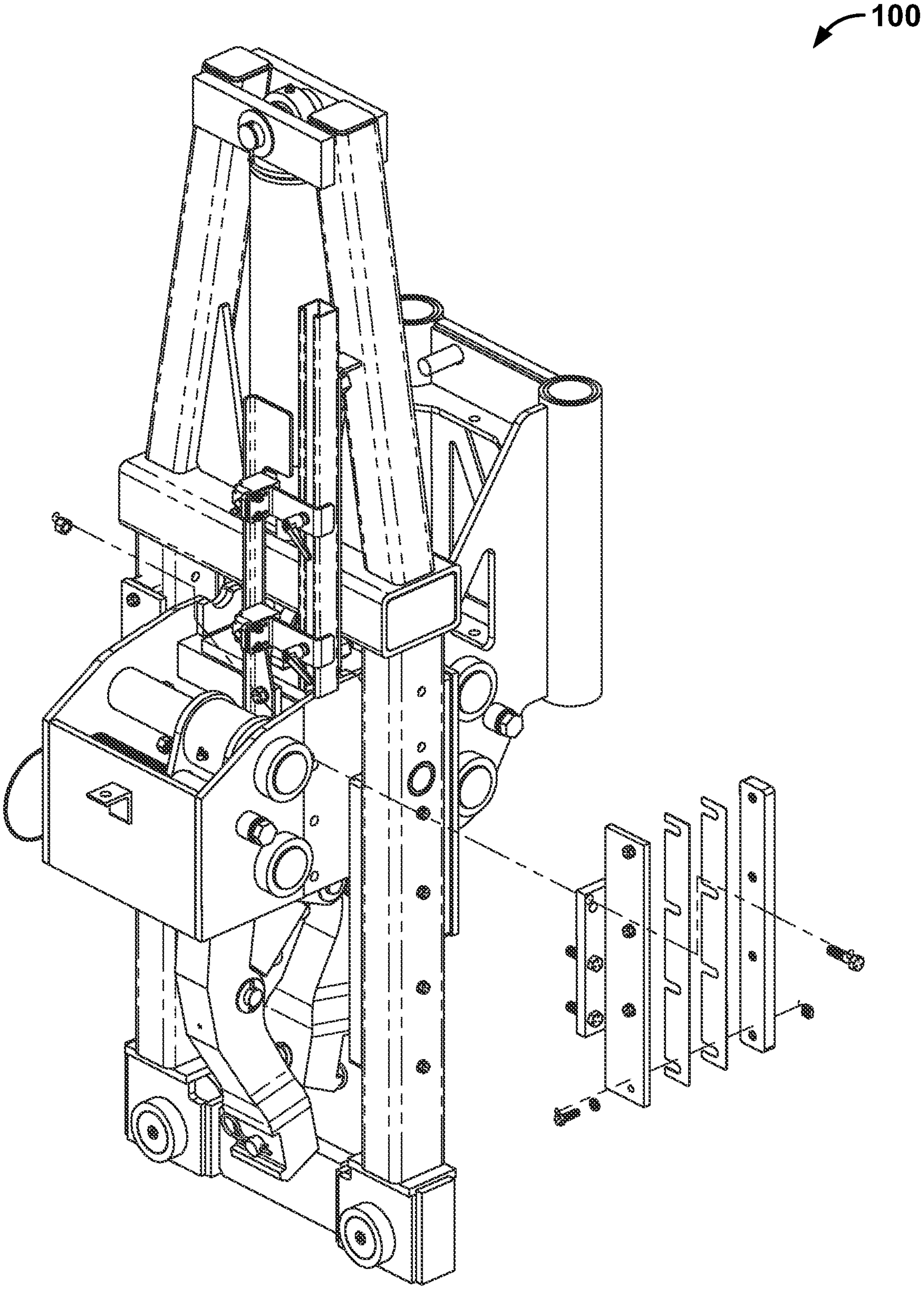
FIG. 6 is a fourth partial detail exploded perspective view of the embodiment shown in FIG. 1.
Figure 7:
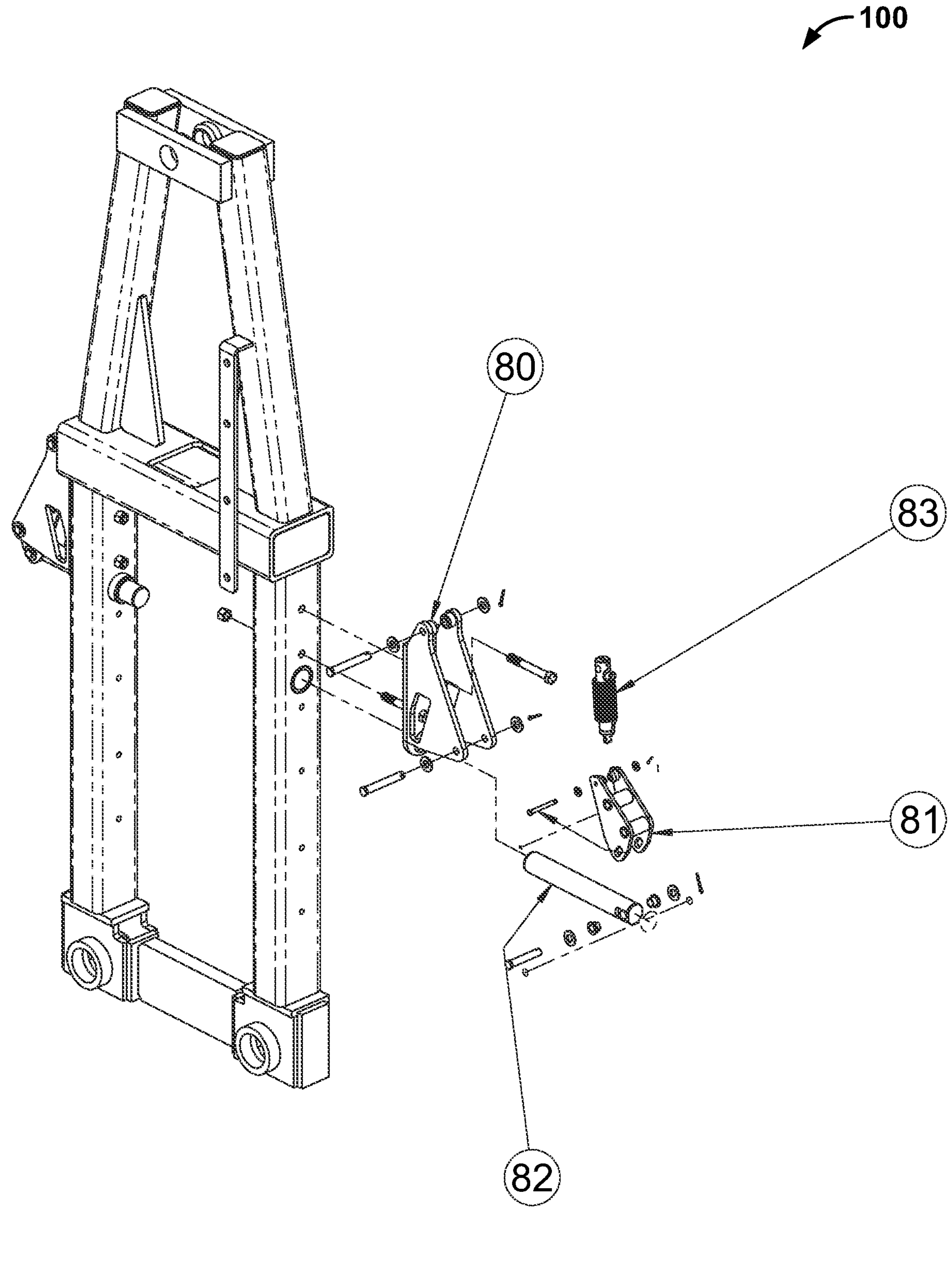
FIG. 7 is a fifth partial detail exploded perspective view of the embodiment shown in FIG. 1.
Figure 18:
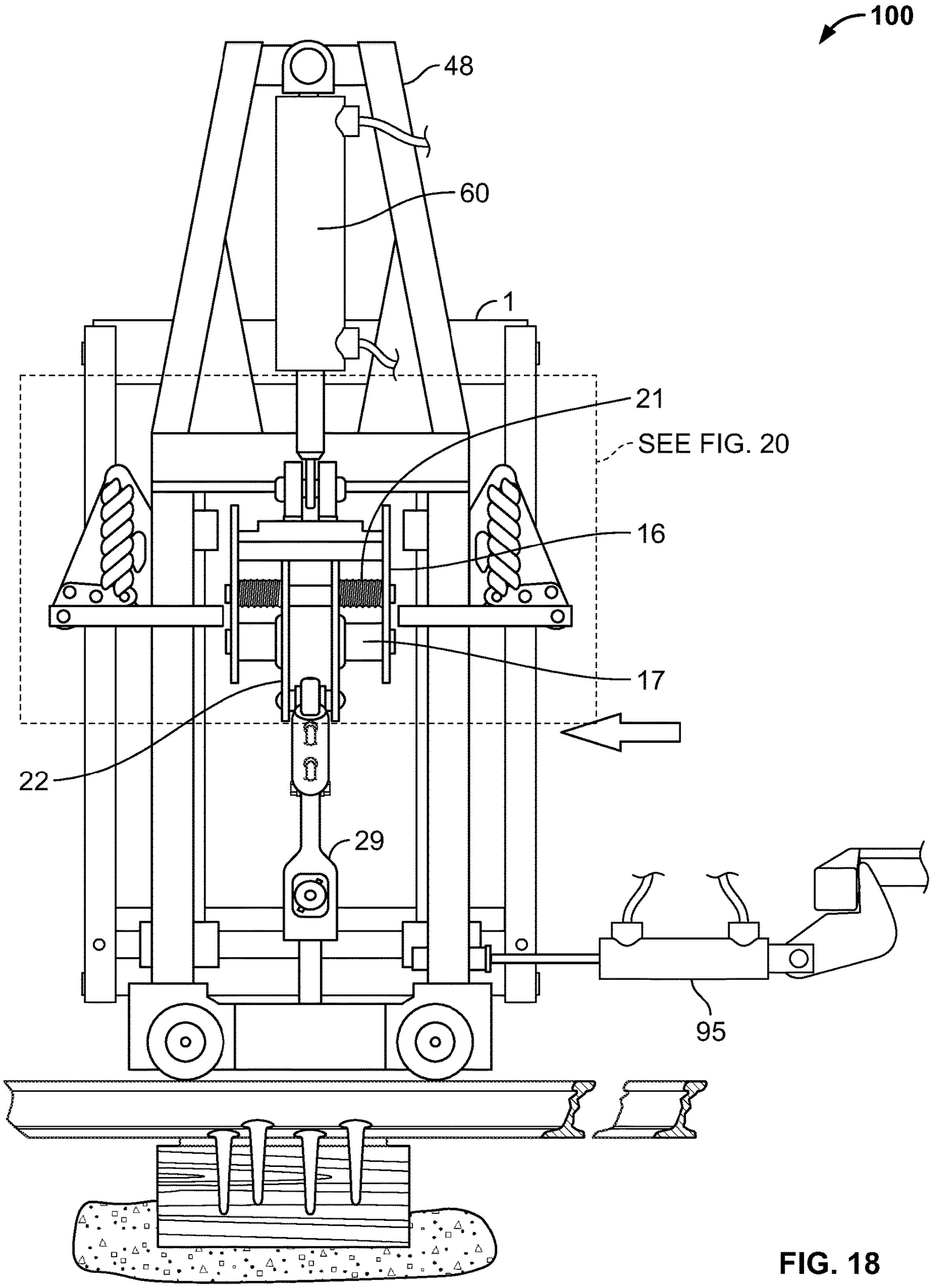
FIG. 18 is a partial cutaway front elevation view of an embodiment of a railroad spike puller apparatus illustrating movement of the apparatus to a first position along a railroad rail.

As shown in the figures, workhead apparatus 100 is configured to move longitudinally along the rail to permit an operator to "spot" the workhead apparatus 100 over a desired tie plate and over a desired one or more railroad spikes to be pulled. More specifically, as shown in FIGS. 2 and 18, spotting cylinder 95 is configured to extend and retract according to an operator's command to move and/or fine-tune the workhead apparatus 100 over a desired tie plate and over a desired one or more railroad spikes to be pulled. Spotting cylinder 95 is configured to attach on one end to the workhead apparatus 100, and on the opposite end to a machine carrying the operator along the rail track.

To operate workhead apparatus 100, there are adjustments that need to be made prior to starting a spike pulling operation, namely to the upper proximity switch 71, the lower proximity switch 71, the pattern or lateral positioning of outside puller arm 29, and the pattern or positioning of inner puller arm 29. The upper proximity switch 71 tells the actuator 32 when to open. This releases the spike and returns the puller arm 29 to the ready position. The lower proximity switch tells the actuator 32 when to squeeze and pull. The squeeze and pull sequence is part of the logic of the machine, but the lower proximity switch 71 is the trigger to tell it when to start the squeeze and pull sequence. The lower limit (i.e., the position of the lower proximity switch 71) is determined by the operator according to the height of the rail and the position of the claw tools positioned on the respective distal ends of the inner and outer puller arms 29. The lower proximity switch 71 should be set at a height to permit the inner and outer claw tools to slide under the head of the spike. If the lower limit is too low, it will hit the edge of the tie plate and damage the tools, tie or tie plate. If the lower limit is too high, it will miss the spike. The upper limit (i.e., the position of the upper proximity switch 71) should allow the spike to be fully removed from the tie plate. If the upper limit is too high, operational cycle time may be wasted. If the upper limit is too low, the spike will hang up in the hole and another cycle will need to be performed or the upper limit will have to be adjusted to remove the spike fully. In addition, the inner and outer adjusting advancing rods 21 comprising, for example, acme threads, can be rotated manually or remotely by an operator as described above to set the pattern of the inner and outer puller arms 29. As shown in the figures, a hex pin on the end of each respective advancing rods 21 enable an operator to rotate the advancing rods 21 with a wrench. In other embodiments, as described above, a bi-directional rotary actuator **21*a*** may be used to set the pattern. The pattern is adjusted based on the particular tie plate configuration of interest or the specific spikes spacing/configuration that are designated to be pulled.

Figure 19:
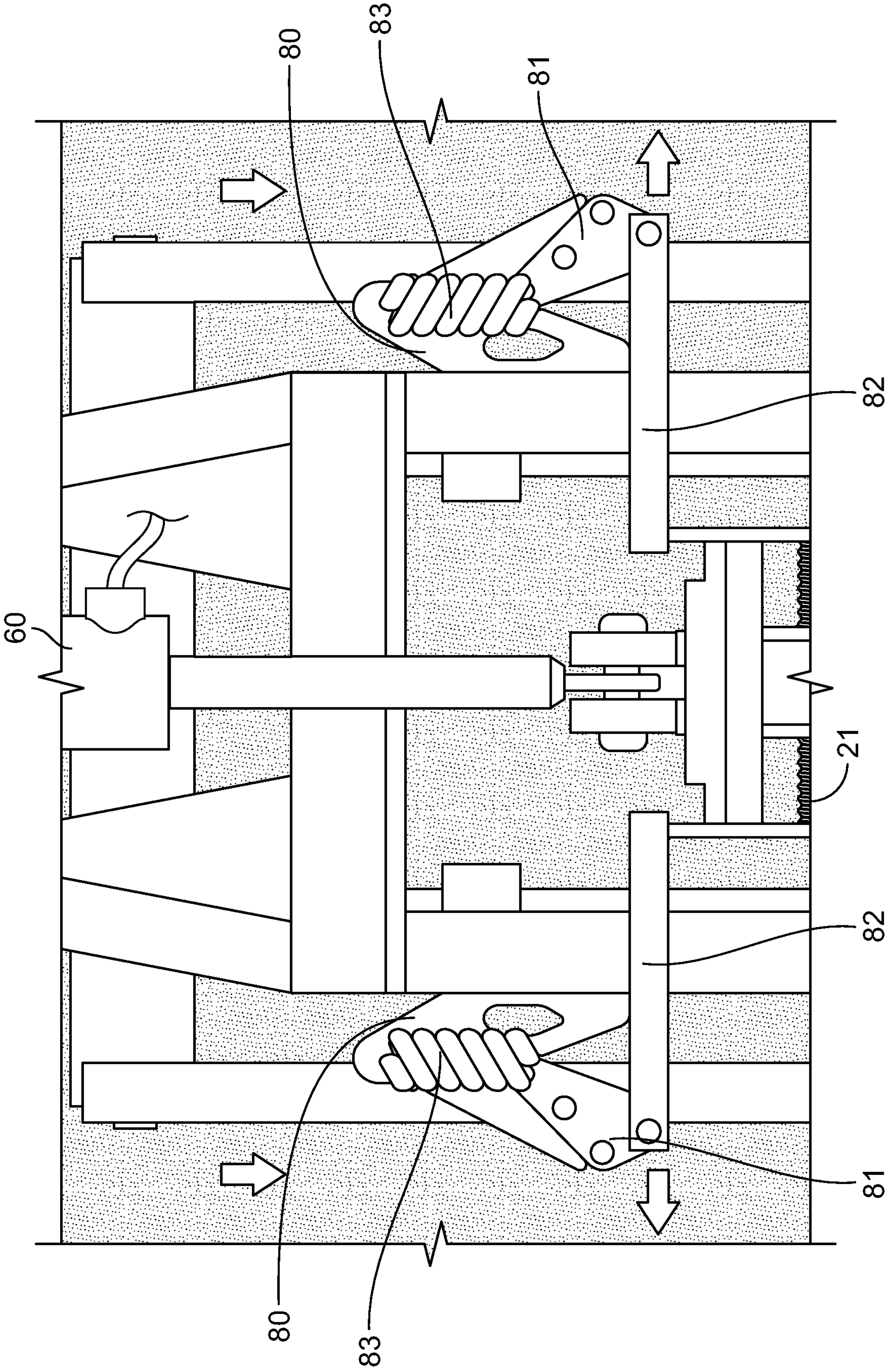
FIG. 19 is a partial detail view of a portion of the embodiment shown in FIG. 18 illustrating a first position of a portion of a mechanism to prepare the railroad spike puller apparatus for a spike pulling operation.
Figure 20:
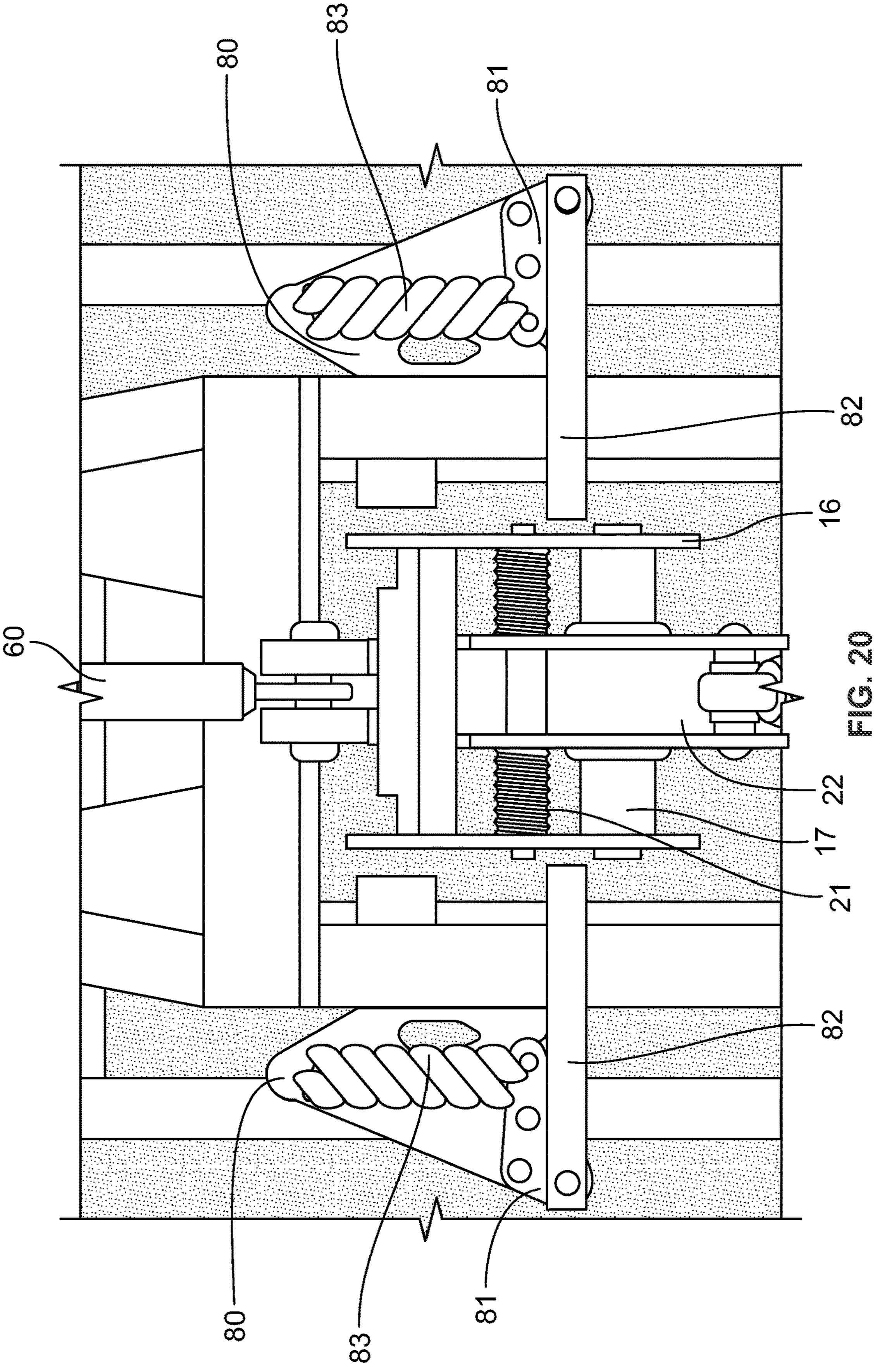
FIG. 20 is a partial detail view of a portion of the embodiment shown in FIG. 18 illustrating a second position of a portion of the mechanism of FIG. 19.
Figure 30:
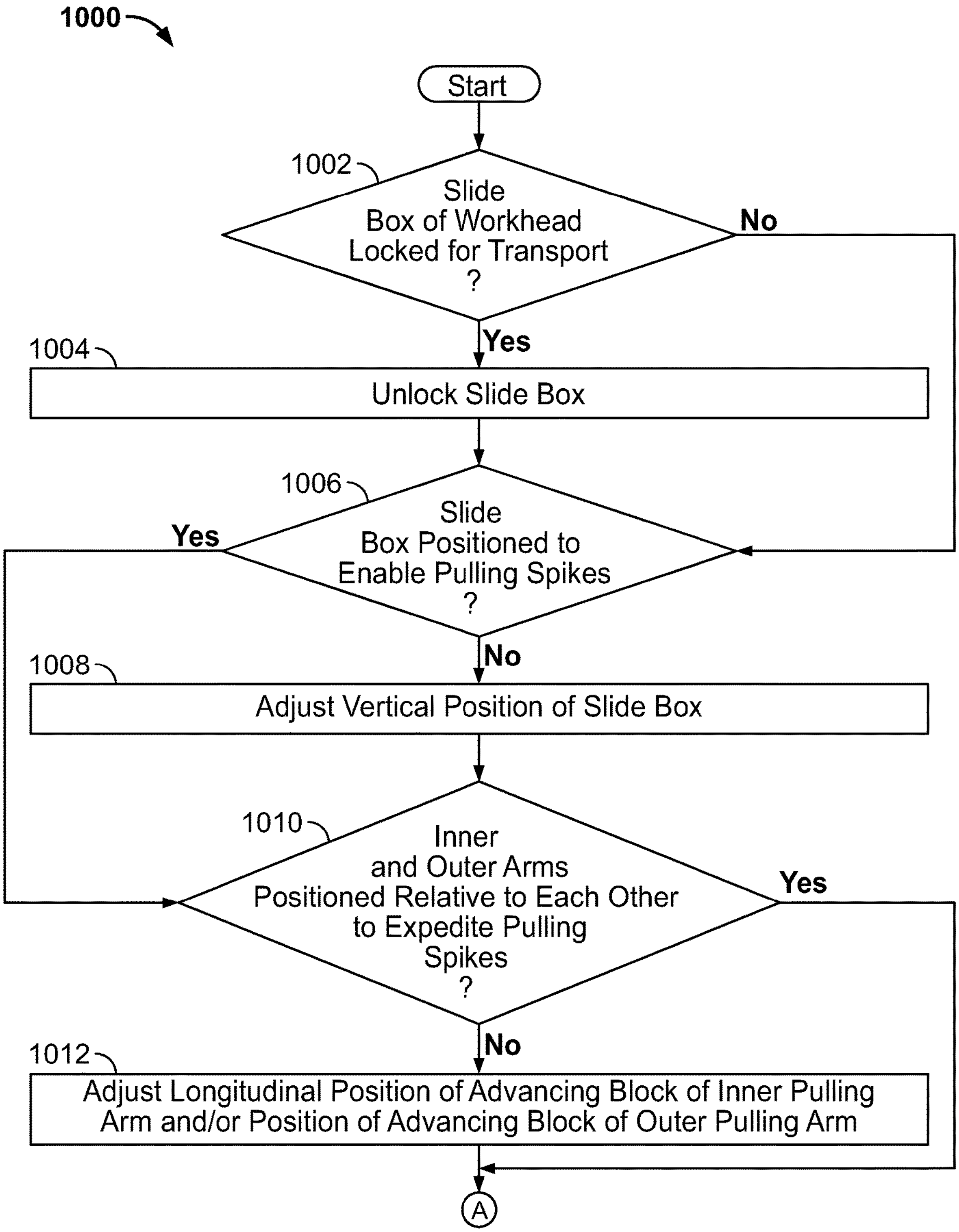
FIGS. 30-31 illustrate one embodiment of a method of using a railroad spike puller apparatus of the instant disclosure.
Figure 31:
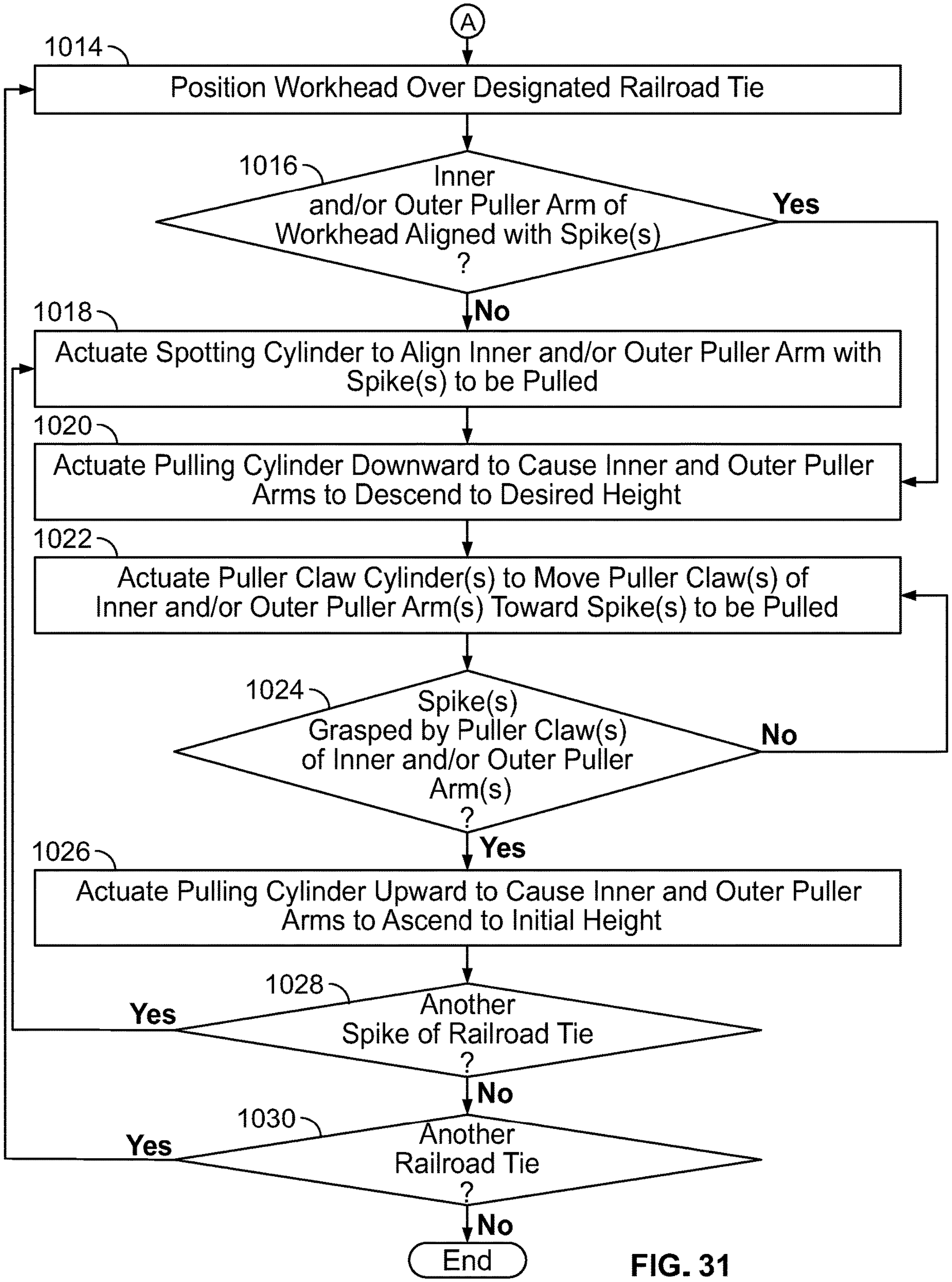

Turning to FIGS. 18-31, there are shown various steps in the process of using workhead apparatus 100 to pull spikes from a railroad tie plate. Referring to FIGS. 30-31, there is shown one embodiment of spike pulling operation 1000. In this embodiment, the starting point is for an operator to determine at step 1002 whether the slide carrier 16 is in slide carrier transport mode or a slide carrier operational mode, as described above. If yes, then at step 1004, the operator proceeds to unlock slide carrier 16, as shown in FIGS. 19-20 and as described above. More particularly, the operator commands actuators 83,**99*a* to their respective extended positions to cause the lock-up mechanism of workhead apparatus 100** to be in the slide carrier operational mode.

At step 1006, the operator determines whether the upper and lower proximity switches 71 are set at the proper height to establish the upper and lower travel limits of the slide carrier 16. If the proximity switches 71 require repositioning, the operator does so at step 1008 by moving the proximity switches 71 as described above. If not, the process moves to step 1010.

At step 1010, the operator determines whether the inner and outer puller arms 29 are in the proper lateral position to match the spike pattern in the tie plate. If the lateral position of one or both puller arms 29 requires repositioning, then at step 1012 the operator may move the desired inner and/or outer advancing block 22 laterally within the slide carrier 16 along advancing shafts 17 by rotating advancing rods 21 to create the required offset between the inner and outer puller arms 29 to match the pattern of the spikes to be pulled.

At step 1014, the operator moves work train into position so that workhead apparatus 100 is generally positioned over a desired railroad tie having spikes to be pulled. At step 1016, the operator determines whether any fine adjustments to the lateral position of the workhead apparatus 100 are required to align the puller arms 29 over the inner and outer spikes to be pulled. If yes, then at step 1018, the operator actuates spotting cylinder 95, as shown in FIG. 18, to position the workhead apparatus 100 as desired.

Figure 21:
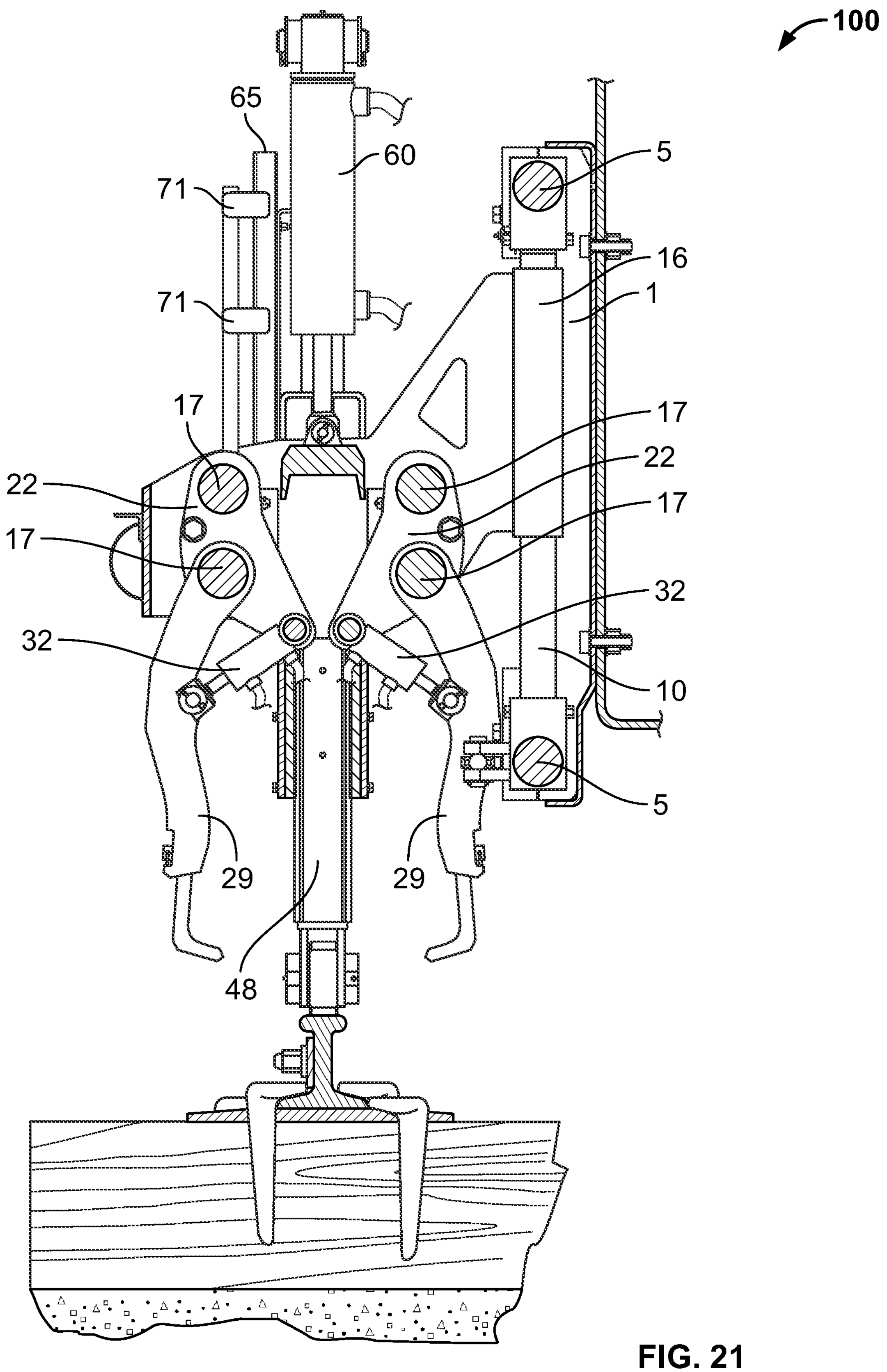
FIG. 21 is a partial cutaway right side elevation view of the embodiment shown in FIG. 18 (see also section lines in FIG. 10) illustrating a first position of the apparatus.
Figure 22:
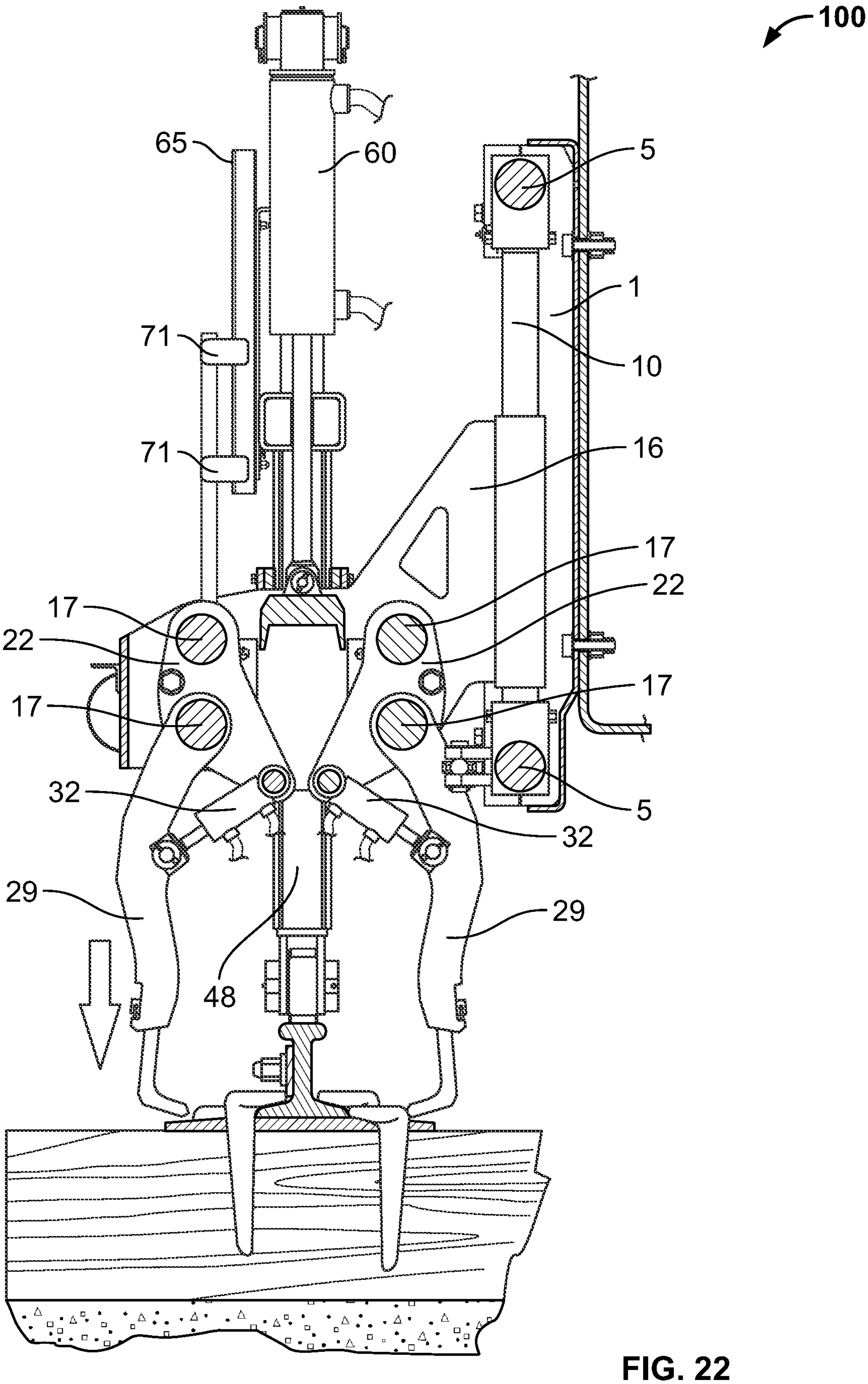
FIG. 22 is a partial cutaway right side elevation view of the embodiment shown in FIG. 18 illustrating a second position of the apparatus.

At step 1020, as shown in FIG. 21 with actuator 60 in the initial, retracted position and with the respective inner and outer actuators 32 in their respective initial, extended position, the operator initiates the pulling spike pulling sequence by extending actuator 60 as shown in FIG. 22. This causes slide carrier 16 to lower toward the rail, and also causes the respective inner and outer puller arms (with claw tools inserted on respective distal ends) to lower toward the tie.

Figure 23:
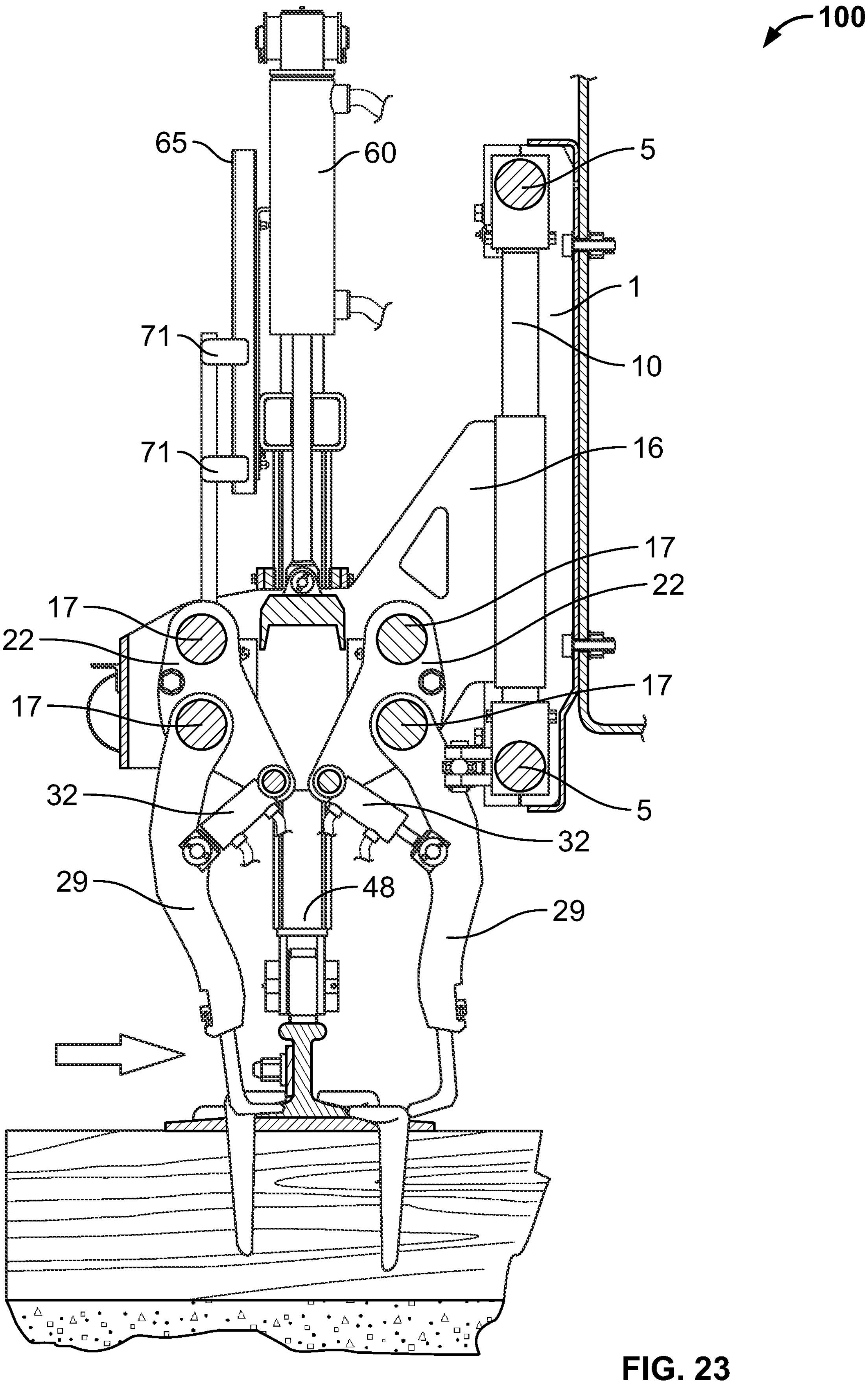
FIG. 23 is a partial cutaway right side elevation view of the embodiment shown in FIG. 18 illustrating a third position of the apparatus.

At step 1022, after reaching the lower limit set by lower proximity switch 71, actuator 60 ceases to further extend and one or both of the inner and outer actuators 32 are commanded, either automatically via control system logic or manually by remote operator triggering, to retract. At step 1024 and as shown in FIG. 23, the head of an outer rail spike is captured by the claw tool attached to the distal end of the outer puller arm 29.

Figure 24:
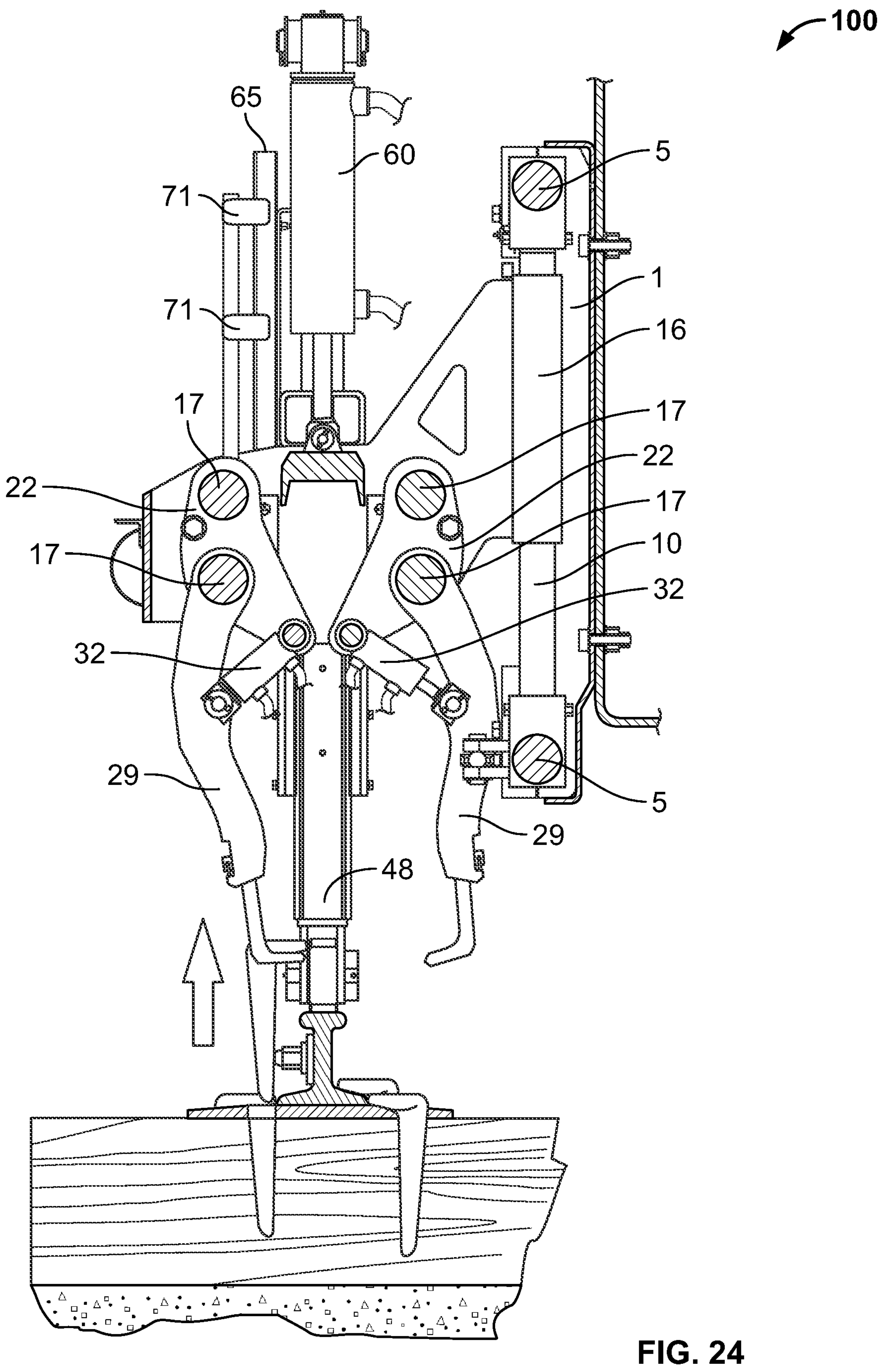
FIG. 24 is a partial cutaway right side elevation view of the embodiment shown in FIG. 18 illustrating a fourth position of the apparatus.
Figure 25:
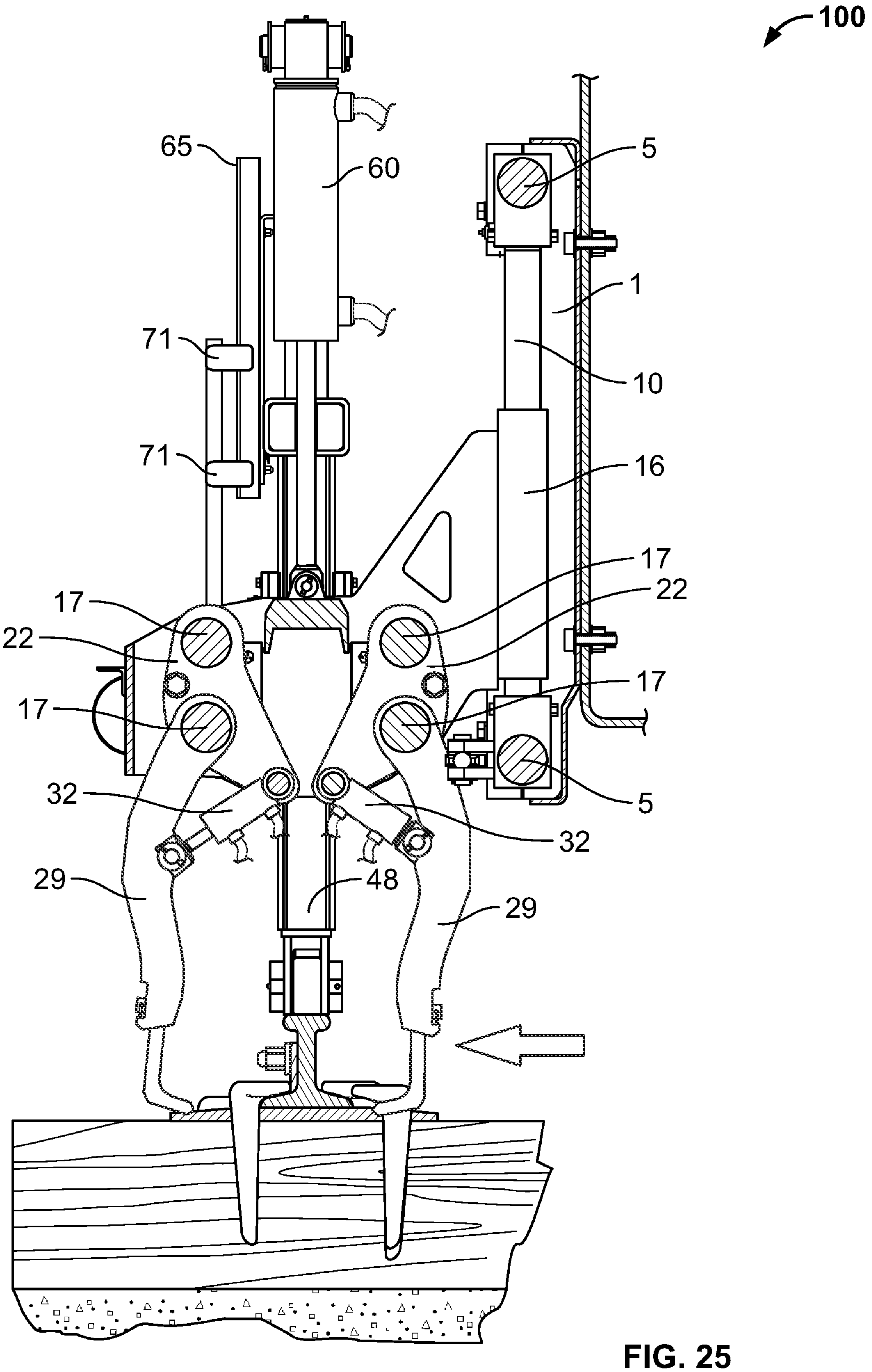
FIG. 25 is a partial cutaway right side elevation view of the embodiment shown in FIG. 18 illustrating a fourth position of the apparatus.
Figure 26:
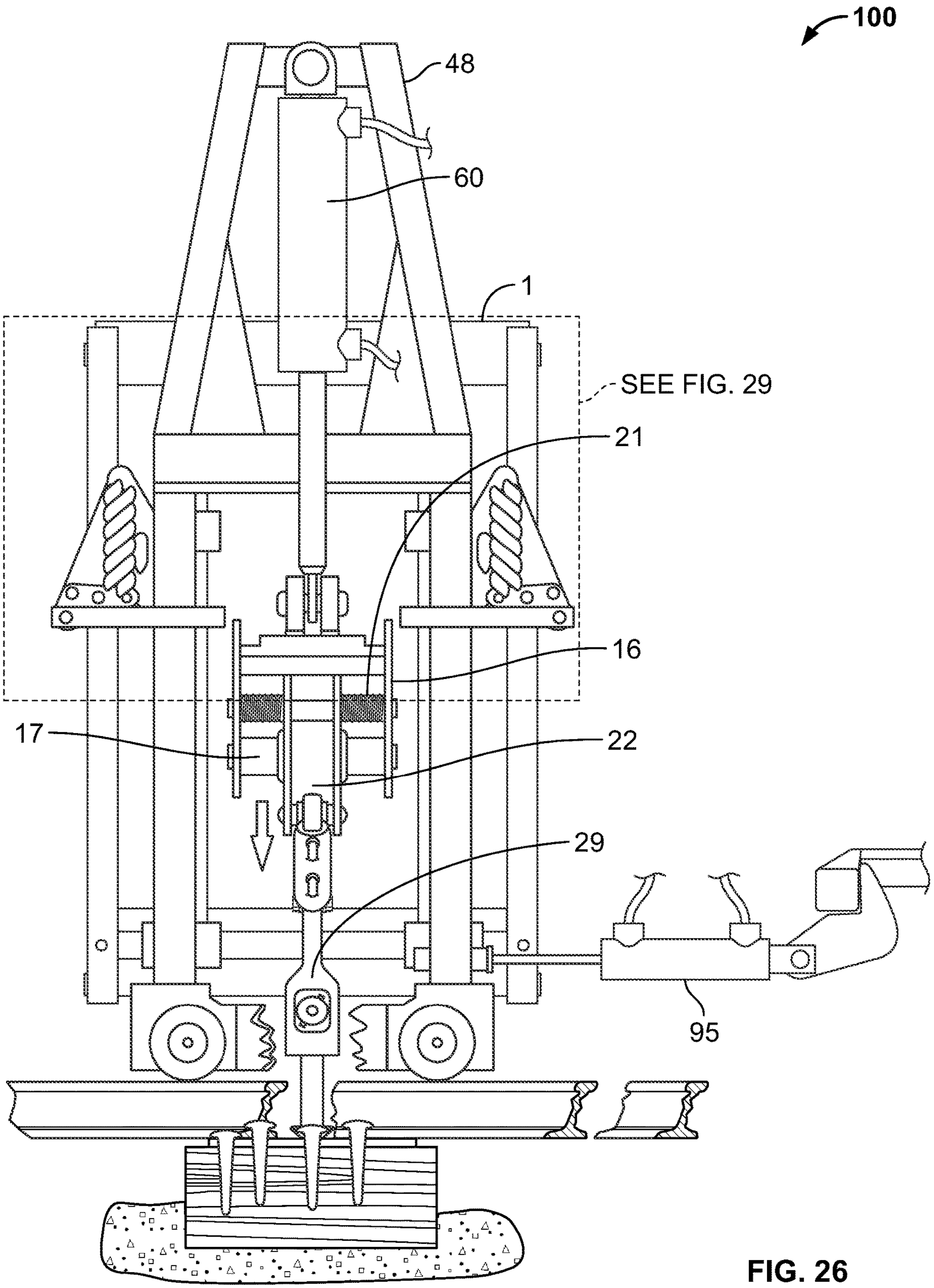
FIG. 26 is a partial cutaway front elevation view of the embodiment shown in FIG. 25.
Figure 27:
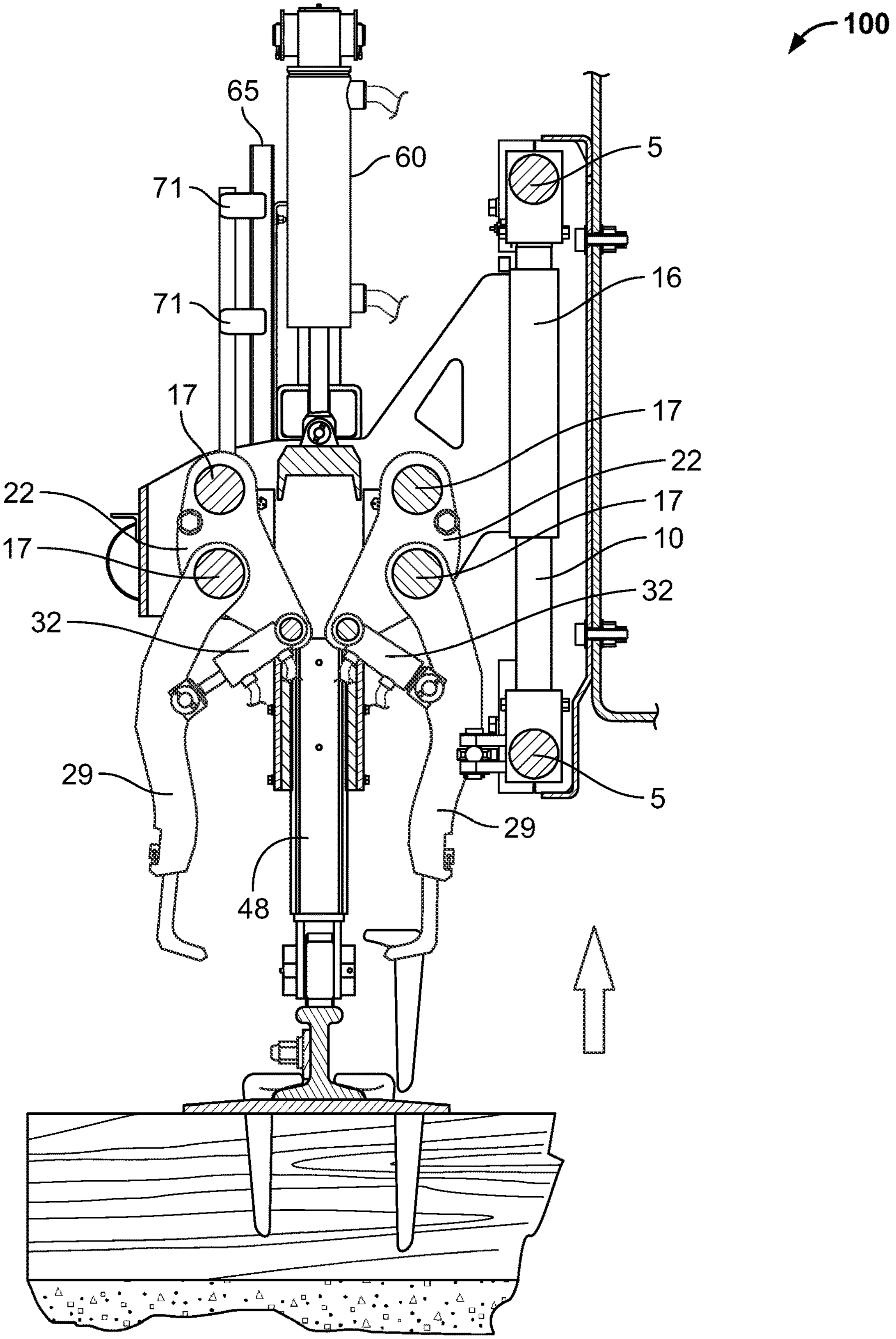
FIG. 27 is a partial cutaway right side elevation view of the embodiment shown in FIG. 18 illustrating a fifth position of the apparatus.
Figure 28:
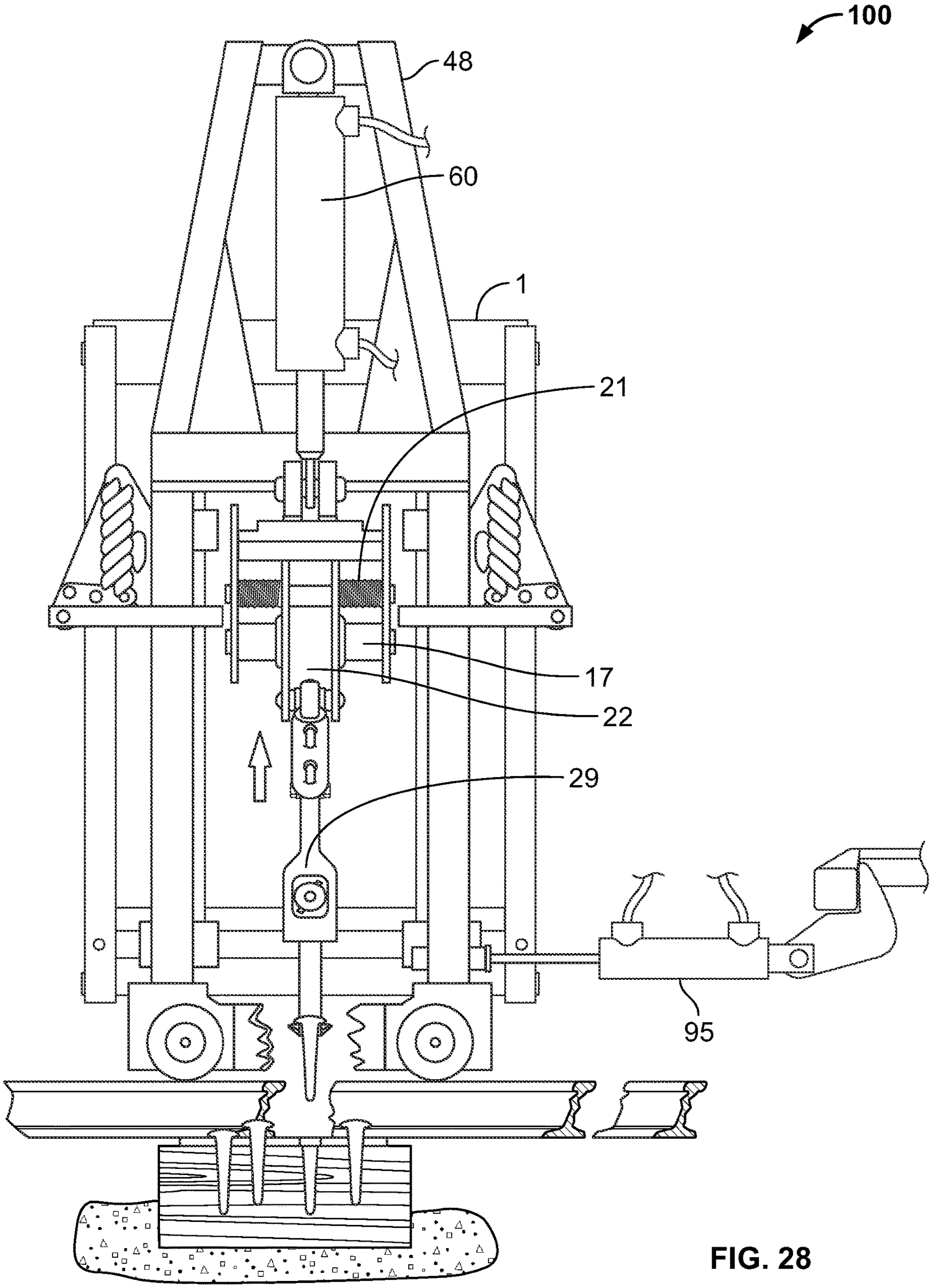
FIG. 28 is a partial cutaway front elevation view of the embodiment shown in FIG. 27.
Figure 29:
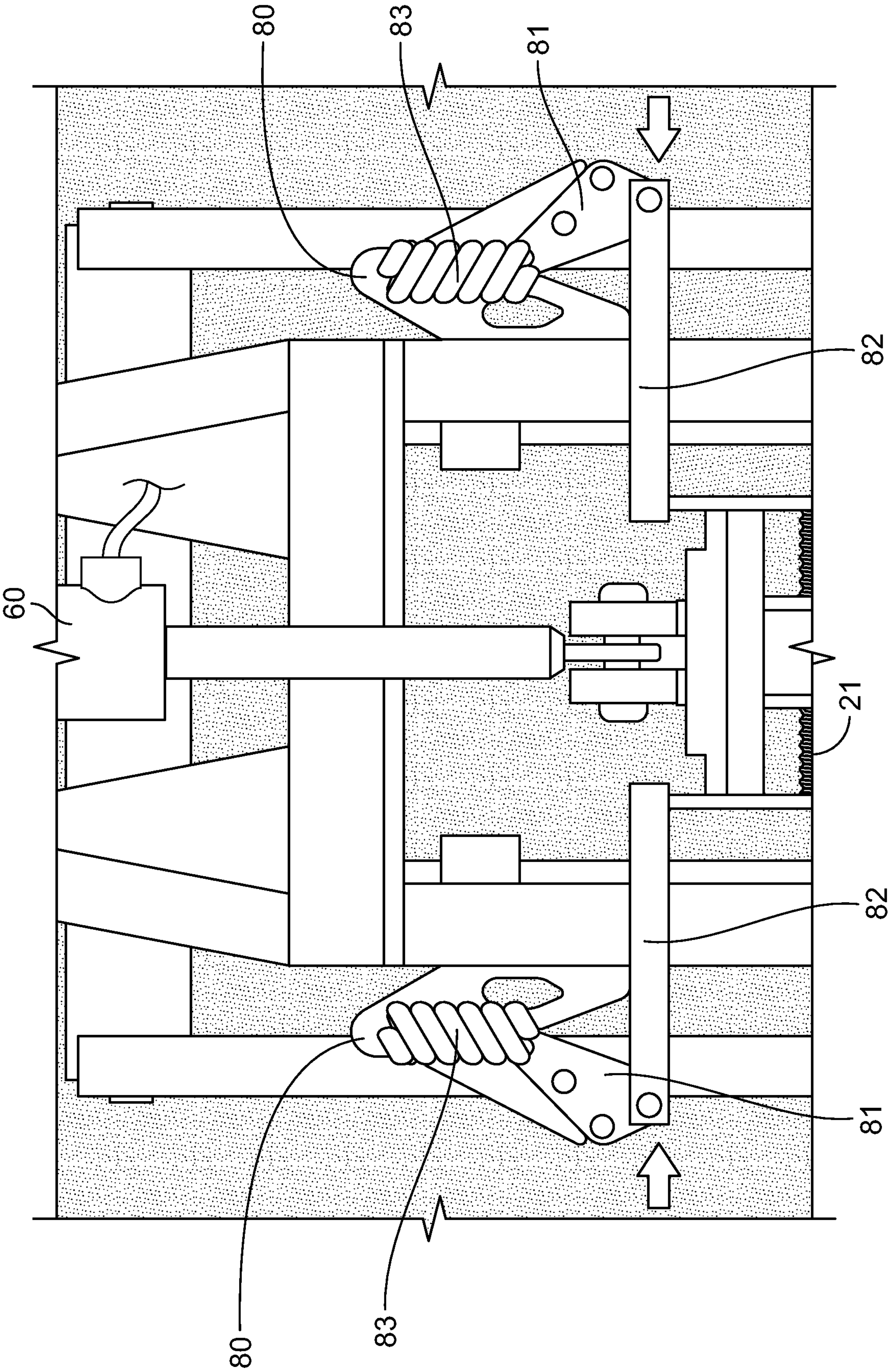
FIG. 29 is a partial detail view of a portion of the embodiment shown in FIG. 26 illustrating return to the first position of a portion of the mechanism of FIG. 21.

At step 1026 and as shown in FIG. 24, the spike is pulled when actuator 60 retracts. Actuator 60 retracts until the upper proximity switch 71 is reached. At this point, the upper proximity switch 71 causes a command to outer actuator 32 to extend, causing the spike to be released from the claw tool. The sequence of steps 1020 through 1026 may be repeated for an inner spike at step 1028, such as the inner anchor spike shown in FIGS. 25-28. Although shown as separate sequences to pull an inner spike and an outer spike, workhead apparatus 100 is configured to operate both puller arms 29 simultaneously.

At step 1030, the operator may move the work train to another railroad tie to repeat the process of pulling spikes using workhead apparatus 100.

Any process descriptions or blocks in the figures should be understood as representing modules, segments, or portions of code which include one or more executable instructions for implementing specific logical functions or steps in the process, and alternate implementations are included within the scope of the embodiments described herein, in which functions may be executed out of order from that shown or discussed, including substantially concurrently or in reverse order, depending on the functionality involved, as would be understood by those having ordinary skill in the art.

The embodiments described herein are possible examples of implementations and are merely set forth for a clear understanding of the principles of the features described herein. Many variations and modifications may be made to the above-described embodiment(s) without substantially departing from the spirit and principles of the techniques, processes, devices, and systems described herein. All such modifications are intended to be included herein within the scope of this disclosure and protected by the following claims.

What is claimed is:

1. A spike puller workhead for pulling spikes from a railroad tie along a rail, comprising:
- a frame;
- a slide carrier slidably coupled to the frame along a vertical axis;
- an inner shaft fixed to the slide carrier, the inner shaft defining an inner longitudinal axis;
- an outer shaft fixed to the slide carrier, the outer shaft defining an outer longitudinal axis;
- an inner puller arm comprising an inner proximal end and an inner distal end, the inner proximal end rotatably coupled to the inner shaft about the inner longitudinal axis, the inner proximal end configured to translate along the inner shaft along the inner longitudinal axis, the inner distal end configured to engage with an inner spike embedded in the railroad tie; and
- an outer puller arm comprising an outer proximal end and an outer distal end, the outer proximal end rotatably coupled to the outer shaft about the outer longitudinal axis, the outer proximal end configured to translate along the inner shaft along the outer longitudinal axis, the outer distal end configured to engage with an outer spike embedded in the railroad tie,
- wherein the inner puller arm is configured to move independently from the outer puller arm.

2. The spike puller workhead of claim 1, wherein the slide carrier is configured to actuate upwardly to cause at least one of:
- the inner puller arm to pull the inner spike from the railroad tie; and
- the outer puller arm to pull the outer spike from the railroad tie.

3. The spike puller workhead of claim 1, further including a puller actuator configured to slide the slide carrier upwardly and downwardly along the vertical axis.

4. The spike puller workhead of claim 1, further including an inner puller arm actuator configured to rotate the inner puller arm about the inner shaft of the slide carrier.

5. The spike puller workhead of claim 4, wherein the inner puller arm actuator extends between and is coupled to the slide carrier and the inner puller arm.

6. The spike puller workhead of claim 4, further including an outer puller arm actuator configured to rotate the outer puller arm about the outer shaft of the slide carrier.

7. The spike puller workhead of claim 6, wherein the outer puller arm actuator extends between and is coupled to the slide carrier and the outer puller arm.

8. The spike puller workhead of claim 1, further including an inner actuator configured to move the inner puller arm along the inner longitudinal axis to adjust an inner longitudinal position of the inner puller arm relative to an outer longitudinal position of the outer puller arm.

9. The spike puller workhead of claim 8, wherein the inner actuator includes a threaded rod and a threaded bushing translate the inner puller arm along the inner longitudinal axis.

10. The spike puller workhead of claim 8, further including an outer actuator configured to translate the outer puller arm along the outer longitudinal axis to adjust the outer longitudinal position of the outer puller arm relative to the inner longitudinal position of the inner puller arm.

11. The spike puller workhead of claim 10, wherein the outer actuator includes a threaded rod and a threaded bushing to translate the outer puller arm along the outer longitudinal axis.

12. The spike puller workhead of claim 1, including a spotting actuator configured to couple the frame to a railroad car to adjust a longitudinal position of the inner puller arm and the outer puller arm.

13. The spike puller workhead of claim 1, wherein the outer puller arm is configured to rotate about the outer longitudinal axis simultaneously with the inner puller arm rotating about the inner longitudinal axis.

14. The spike puller workhead of claim 13, further comprising a switch to enable an operator to select between operating the inner puller arm and the outer puller arm independently or simultaneously.

15. A spike puller workhead for pulling spikes from a railroad tie along a rail, comprising:
- a frame;
- a slide carrier slidably coupled to the frame along a vertical axis;
- an inner shaft fixed to the slide carrier, the inner shaft defining an inner longitudinal axis;
- an outer shaft fixed to the slide carrier, the outer shaft defining an outer longitudinal axis;
- an inner puller arm comprising an inner proximal end and an inner distal end, the inner proximal end coupled to the inner shaft, the inner proximal end rotatably movable about the inner longitudinal axis and translatably movable along the inner shaft, the inner distal end configured to engage an inner spike embedded in the railroad tie; and
- an outer puller arm comprising an outer proximal end and an outer distal end, the outer proximal end coupled to the outer shaft, the outer proximal end rotatably movable about the outer longitudinal axis and translatably movable along the outer shaft, the outer distal end configured to engage an outer spike embedded in the railroad tie,
- wherein the inner puller arm rotatably and translatably moves independently from the outer puller arm.

16. The spike puller workhead of claim 15, wherein the slide carrier is configured to move upwardly to cause at least one of:
- the inner puller arm to pull the inner spike from the railroad tie; and
- the outer puller arm to pull the outer spike from the railroad tie.

17. The spike puller workhead of claim 15, further including a puller actuator configured to move the slide carrier upwardly and downwardly along the vertical axis.

18. The spike puller workhead of claim 15, further including an inner actuator configured to translate the inner puller arm along the inner longitudinal axis to adjust a longitudinal position of the inner puller arm, and an outer actuator configured to translate the outer puller arm along the outer longitudinal axis to adjust the longitudinal position of the outer puller arm.

19. The spike puller workhead of claim 18, wherein the inner actuator includes an inner threaded rod and an inner threaded bushing, and the outer actuator includes an outer threaded rod and an outer threaded bushing.

20. The spike puller workhead of claim 15, wherein the inner puller arm and the outer puller arm are configured to simultaneously engage the respective inner and outer spikes.

* * * * *